United States Patent [19]

Abreu et al.

[11] Patent Number: 5,754,956
[45] Date of Patent: May 19, 1998

[54] METHODICAL SCANNING METHOD AND APPARATUS FOR PORTABLE RADIOTELEPHONES

[75] Inventors: Victor M. Abreu; Raul A. Pombo, both of Grayslake, Ill.; Paul D. Marko, Penbroke Pines; David L. Brown, Miami, both of Fla.

[73] Assignee: Motorola, Inc., Schaumburg, Ill.

[21] Appl. No.: 531,257

[22] Filed: Sep. 20, 1995

[51] Int. Cl.⁶ .................................................. H04Q 7/20
[52] U.S. Cl. ........................ 455/434; 455/437; 455/515; 455/525
[58] Field of Search ............... 379/58, 62, 63, 379/61; 455/38.3, 343, 33.1, 34.1, 54.1, 54.2, 56.1, 62, 89, 33.4, 434, 436, 437, 450–452, 515, 524–525; 370/329, 333, 337

[56] References Cited

U.S. PATENT DOCUMENTS

| | | | |
|---|---|---|---|
| 4,977,611 | 12/1990 | Maru | 455/161 |
| 5,301,356 | 4/1994 | Bodin et al. | 455/33.2 |
| 5,301,359 | 4/1994 | Van Den Heuvel et al. | 455/56.1 |
| 5,313,653 | 5/1994 | Sasuta | 455/17 |
| 5,442,634 | 8/1995 | Cizek | 370/95.1 |
| 5,471,670 | 11/1995 | Hess et al. | 455/33.2 |
| 5,475,862 | 12/1995 | Sawyer | 455/33.1 |
| 5,504,803 | 4/1996 | Yamada et al. | 379/59 |
| 5,551,059 | 8/1996 | Hutcheson et al. | 455/33.2 |
| 5,574,996 | 11/1996 | Raith | 455/161.3 |
| 5,577,103 | 11/1996 | Foti | 379/59 |
| 5,603,085 | 2/1997 | Shedlo | 455/33.1 |
| 5,613,208 | 3/1997 | Blackman et al. | 455/34.1 |
| 5,613,213 | 3/1997 | Naddell et al. | 455/54.1 |

FOREIGN PATENT DOCUMENTS

WO92/14308  8/1992  WIPO ............................ H04B 7/00

OTHER PUBLICATIONS

*Personal Handy Phone System*, RCR Standard (RCR STD–28), Version 1, (Rev. 1), Research & Development Center for Radio Systems, Dec. 20, 1993, Rev. 1 Mar. 3, 1995.

European Telecommunication Standard ETS 300 175–3, *Radio Equipment and Systems (RES); Digital European Cordless Telecommunications (DECT) Common Interface, Part 3: Medium access control layer*, E.T.S.I., Oct. 1992.

*Primary Examiner*—Andrew Faile
*Assistant Examiner*—Vincent F. Boccio
*Attorney, Agent, or Firm*—John G. Rauch

[57] ABSTRACT

A radiotelephone handset (120) includes an antenna (122) and receiver (124) for receiving a control channel from a plurality of base stations (102, 104, 106). A time division multiple access controller circuit (126) coupled to the receiver stores all received control channel information in a captured data buffer (134). Under control of a processor (128), the handset identifies as candidate suitable base stations those base stations having acceptable received signal strength, acceptable identity or system capability. From the candidates, the handset (120) chooses a suitable base station having acceptable signal quality, access rights and system capability and synchronizes communication with the suitable base station.

11 Claims, 22 Drawing Sheets

CANDIDATE PROFILE TABLE

| # | Field |
|---|---|
| 189 | SC |
| 191 | BC |
| 192 | RSSI COUNT |
| 193 | CRC COUNT |
| 194 | MISSING COUNT |
| 195 | IDENTITY FLAG |
| 196 | SYSTEM CAPABILITY FLAG |
| 197 | AQUIRE SLOT/BIT SYNCHRONIZATION FLAG |
| 198 | AQUIRE MULTIFRAME OR SUPERFRAME FLAG |
| 199 | CONTROL DATA RECEIVED |

*FIG. 4*

METHODICAL SCANNING METHOD AND APPARATUS FOR PORTABLE RADIOTELEPHONES

FIELD OF THE INVENTION

The present invention generally relates to portable radiotelephone communications. The present invention more particularly relates to a method and apparatus for detecting control signals transmitted by radiotelephone base stations and identifying and synchronizing to a suitable base station by a portable radiotelephone handset.

BACKGROUND OF THE INVENTION

Cellular and cordless telephone systems, or radiotelephone systems, generally include one or more base stations, also known as fixed parts or FPs, and one or more handsets, also known as portable parts or PPs. The handsets, when active, are in communication with the one or more base stations using radio frequency (RF) communication. The base stations are also in communication with and provide an interface to hardwired telephone systems. Through RF communication with the base stations, the handsets communicate with the hardwired telephone system or with other handsets.

The base stations are arranged in adjacent geographical cells. Handsets within a given cell communicate with the associated base station. As a handset is transported from cell to adjacent cell, communication with the handset is handed off from base station to adjacent base station. Because of overlap between cells and a variable communication environment, a handset may receive RF signals from more than one base station at varying signal strengths and receive transmitted data with varying signal quality.

Only one or a few base stations in communication with a handset may be suitable for establishing a telephone call with the handset. Not all base stations have appropriate system capability to accommodate each respective handset. Also, the handset may lack appropriate access rights for the base station. Still further, the handset may be limited to communication with a certain subset of base stations, and a base station may lack the proper identity for communication with the handset.

In some cellular and cordless telephone systems, communications with the base station are synchronized to timing maintained at the base station. Systems in which such synchronization occurs include Digital European Cordless Telephone (DECT) systems, used in Europe, and Personal Handy Phone Systems (PHS), used in Japan. When the handset is turned on or when the handset enters a cell, the handset must synchronize to the base station timing using the signal received from the base station. The handset must also determine if the base station has appropriate system capability and acceptable identity and if the RF link is of appropriate quality to accommodate the handset. If any of these characteristics are lacking, the base station is not suitable and the handset must search for and synchronize with another base station. Once synchronization is established, communication including a completed telephone call may proceed.

To establish synchronization, each base station transmits a beacon or control channel or signal for the handset to detect. The control channel contains base station identity information and information about base station system capability. To initiate communication, a handset receives the control channel and decodes the information contained therein. Synchronization is necessary both for the handset to initiate an outgoing call and to receive an incoming call.

In many cases, adjacent base stations are not mutually synchronized in the timing of their respective control channels. This is particularly true in residential applications. As a result, timing of control channels transmitted by adjacent base stations could overlap. Timing overlap could result from a lack of initial synchronization or from drift over time in control channel timing in one or more base stations.

Lack of synchronization in control channel timing could prevent a handset from detecting the control channel of the base station for which the handset is searching. If the handset receives the control signal of a base station whose timing leads the timing of a second, lagging base station, the handset may not be able to detect the control signal of the lagging base station. The handset may receive portions of both control channels so that neither channel is received without error. This condition will limit or prevent synchronization and initialization of communication between the base station and the handset.

A further concern in operation of a cordless or cellular handset is depletion of the handset battery. Handsets are generally battery powered and have limited talk and standby times. Because of the limited power available from the battery which provides energy to the handset, the handset may deplete the battery while searching for a control channel.

Accordingly, there is a need for a method for detecting and resolving overlapping conditions among control channels transmitted by near or adjacent base stations and for finding the most suitable base station for initiating communication. There is a further need for such a method which minimizes battery depletion during the synchronization process.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing in the several figures of which identical reference characters indicate identical elements and wherein:

FIG. 4 is an illustration of a candidate profile table for use in conjunction with the cordless telephone handset of FIG. 2.

DETAIL DESCRIPTION OF THE PREFERRED EMBODIMENT

Figure 1:
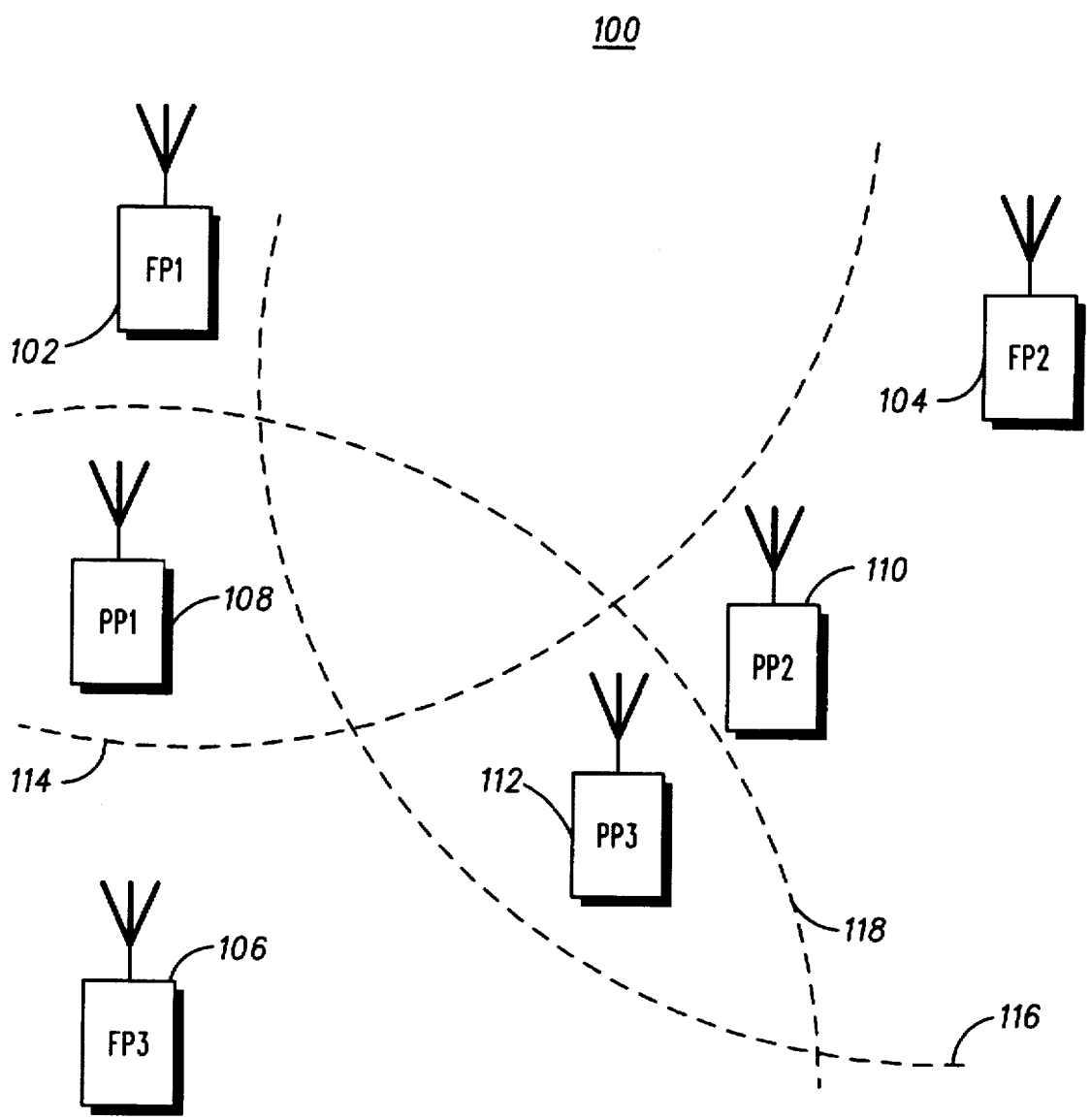
FIG. 1 is a telecommunication system.

Referring now to FIG. 1, a telecommunication system 100 includes a first base station 102, a second base station 104 and a third base station 106. Each base station 102, 104, 106 may also be referred to as a fixed part or FP or radio fixed part or RFP. The telecommunication system 100 further includes a first handset 108, a second handset 110 and a third handset 112. Each handset 108, 110, 112 may also be referred to as a portable part or PP.

The telecommunication system 100 may be a system implementing the Digital European Cordless Telecommunication (DECT) standard as defined in "Radio Equipment and Systems; Digital European Cordless Telecommunications Common Interface Part 3: Medium Access Control Layer," ETS 300 175-3 (1992) published by the European Telecommunications Standards Institute, which is incorporated herein by reference. The telecommunication system 100 may also be a system implementing the Personal Handy Phone System (PHS) as defined in "Personal Handy Phone System RCR STD-28 Version 1 (Rev. -1)" (1995) published by the Research & Development Center for Radio Systems, which is also incorporated herein by reference. The telecommunication system 100 may alternatively be a system implementing another cordless or cellular telephone system or standard. The telecommunication system 100 may include any number of base stations and any number of handsets.

In the telecommunication system 100, the handsets 108, 110, 112 are selectively in radio communication with one or more of the base stations 102, 104, 106. Each base station communicates with handsets within a defined region surrounding the respective base station. For example, base station 102 communicates with handsets such as handset 108 in region 114, base station 104 communicates with handsets such as handsets 110, 112 in region 116, and base station 106 communicates with handsets such as handsets 108, 112 in region 118. Regions 114, 116, 118 for respective base stations 102, 104, 106 may overlap, so that a handset 108, 112 may be capable of communicating with more than one base station 102, 104, 106. However, communication quality between the handset and each respective base station may vary depending on distance to the base station, channel availability and other factors. Also, the handsets 108, 110, 112 are generally portable in nature and may be transported among regions 114, 116, 118.

The base stations 102, 104, 106 are also in communication with the public switched telephone network (PSTN) (not shown) and allow communication between each respective handset 108, 110, 112 and the PSTN or another respective handset 108, 110, 112. Within the telecommunication system 100, communication in the form of telephone calls may be initiated by a handset 108, 110, 112 or by a base station 102, 104, 106.

For initiation of communication, each base station 102, 104, 106 continuously broadcasts a beacon or control channel signal. The control channel contains information defining base station system capability and identity information for each of the respective base stations 102, 104, 106. From the identity information, which may be, for example, a 9-bit operator code defining the operator of the base station, the handset can determine if it has access rights for the base station. If the handset has access rights, the handset is able to communicate with the base station. For example, in the PHS system, the identity information includes an operator code unique to the operator of the base station. Upon receipt of the control channel, the handset will search for the operator code in order to determine the handset's access rights. In the DECT system, the base station transmits a public operator code which is used in a similar manner.

This information allows a handset to identify a particular base station. A handset 108, 110, 112 within the region associated with a base station receives the control channel in order to detect if the handset 108, 110, 112 is within range of the base station 102, 104, 106. The handset 108, 110, 112 also determines from the base station system capability information if the base station 102, 104, 106 is acceptable to the handset.

Figure 2:
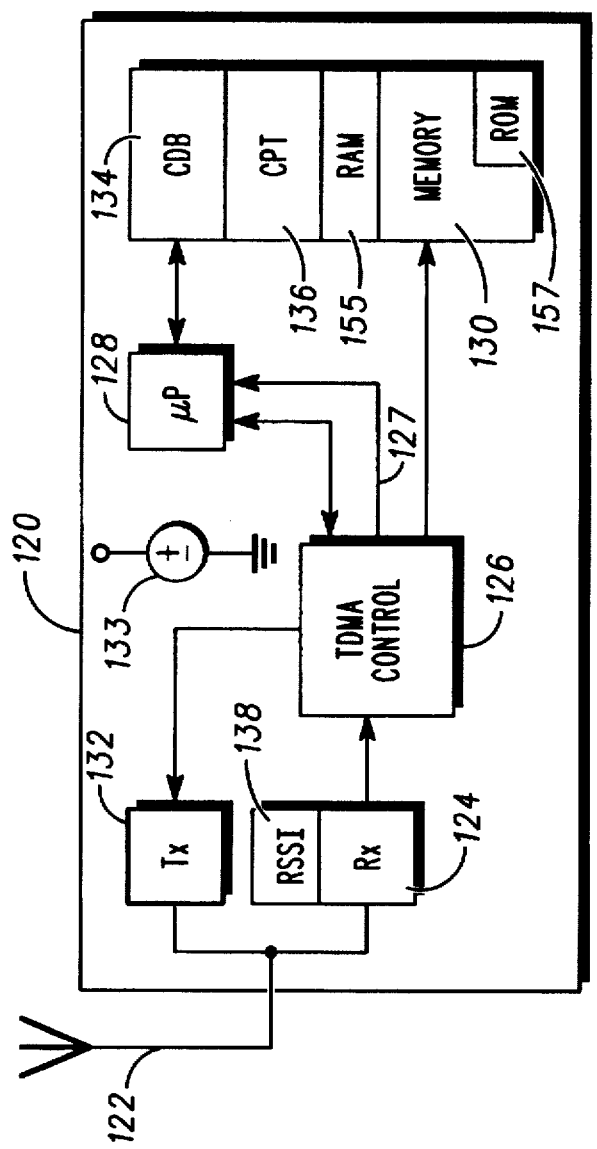
FIG. 2 is a block diagram of a cordless telephone handset for use in the system of FIG. 1.

Referring now to FIG. 2, there is shown a block diagram of a cordless telephone handset 120 according to the present invention for use in the system of FIG. 1. Handset 120 includes an antenna 122, a receiver 124, a time division multiple access (TDMA) controller 126, a processor 128, a memory 130, a transmitter 132 and a battery 133 for providing operational power to the handset 120. The handset 120 may include other operational or user interface features not shown in FIG. 2, such as a keyboard, a display, a microphone and a speaker. Antenna 122 may also comprise more than a single antenna.

Receiver 124 is coupled to the antenna 122 and detects radio signals received by the antenna 122. The received radio signals are broadcast by one or more base stations 102, 104, 106 (FIG. 1) and include control information and voice and data encoded in a carrier signal. The received radio signals include radio signals corresponding to one or more control channel signals. The received radio signals are transmitted over one or more frequencies or slots using a multiple access technique such as time division multiple access. For example, according to the DECT protocol, 10 frequencies and 24 slots are assigned for communication between a base station 102, 104, 106 and the handset 120. The receiver 124 demodulates the received radio signals and determines a cyclical redundancy check or CRC status for each control signal. The receiver 124 also includes a received signal strength indicator 138 which provides a received signal strength indication.

The TDMA controller 126 is coupled to the receiver 124. The TDMA controller 126 receives the radio signals from the receiver. The TDMA controller 126 scans frequencies for signals transmitted by one of the base stations 102, 104, 106. The TDMA controller 126 writes all received data in memory 130, as will be discussed below. The frequency scan and data storage operations of the TDMA controller 126 may be temporarily inhibited in response to a control signal received from the processor 128. The TDMA controller 126 may perform other functions as well.

The processor 128 controls the overall operation of the handset 120. The processor 128 is preferably implemented as a single chip microcontroller. An interrupt request line 127 couples the processor 128 to the TDMA controller 126. The TDMA controller 126 transmits interrupt signals over the interrupt request line 127. In response to the interrupt signals, the processor 128 interrupts normal instruction execution and executes predetermined subsets of instructions, in a manner well-known in the art. The processor operates in response to instructions and data stored in memory 130.

The processor 128 also controls operation of the handset 120 in a sleep mode. To conserve energy stored in the battery 133, when the handset 120 does not detect a control channel received by the receiver 124, the processor places the handset 120 in sleep mode. In sleep mode, operating power is removed from portions of the handset 120, such as the transmitter 132, the receiver 124 and portions of the TDMA controller 126 to minimize power consumption of the handset 120. At the end of the sleep interval, the TDMA controller 126 conveys a Sleep interrupt to the processor 128. In response to the Sleep interrupt, the processor 128 causes the handset 120 to exit sleep mode. If no Sleep interrupt is received, the handset 120 remains in sleep mode until expiration of the Sleep interval. The duration of the Sleep interval may be varied by the handset 120 to further optimize power consumption of the handset 120.

The memory 130 stores data and instructions for control and operation of the handset 120. The memory includes a captured data buffer 134 and a candidate profile table 136, as will be discussed below. Further, the memory 130 includes a RAM portion 135 which stores variables and operators such as logical flags used by the processor 128 and a ROM portion 137 for storing control instructions for the processor 128.

The transmitter 132 is coupled to the TDMA controller 126 and the antenna 122. The TDMA controller 126 provides radio signals to the transmitter 132 corresponding to data to be transmitted to a base station 102, 104, 106. The transmitter 132 encodes and amplifies the radio signals and provides the radio signals to the antenna 122 in a manner well known in the art.

Figure 3A:
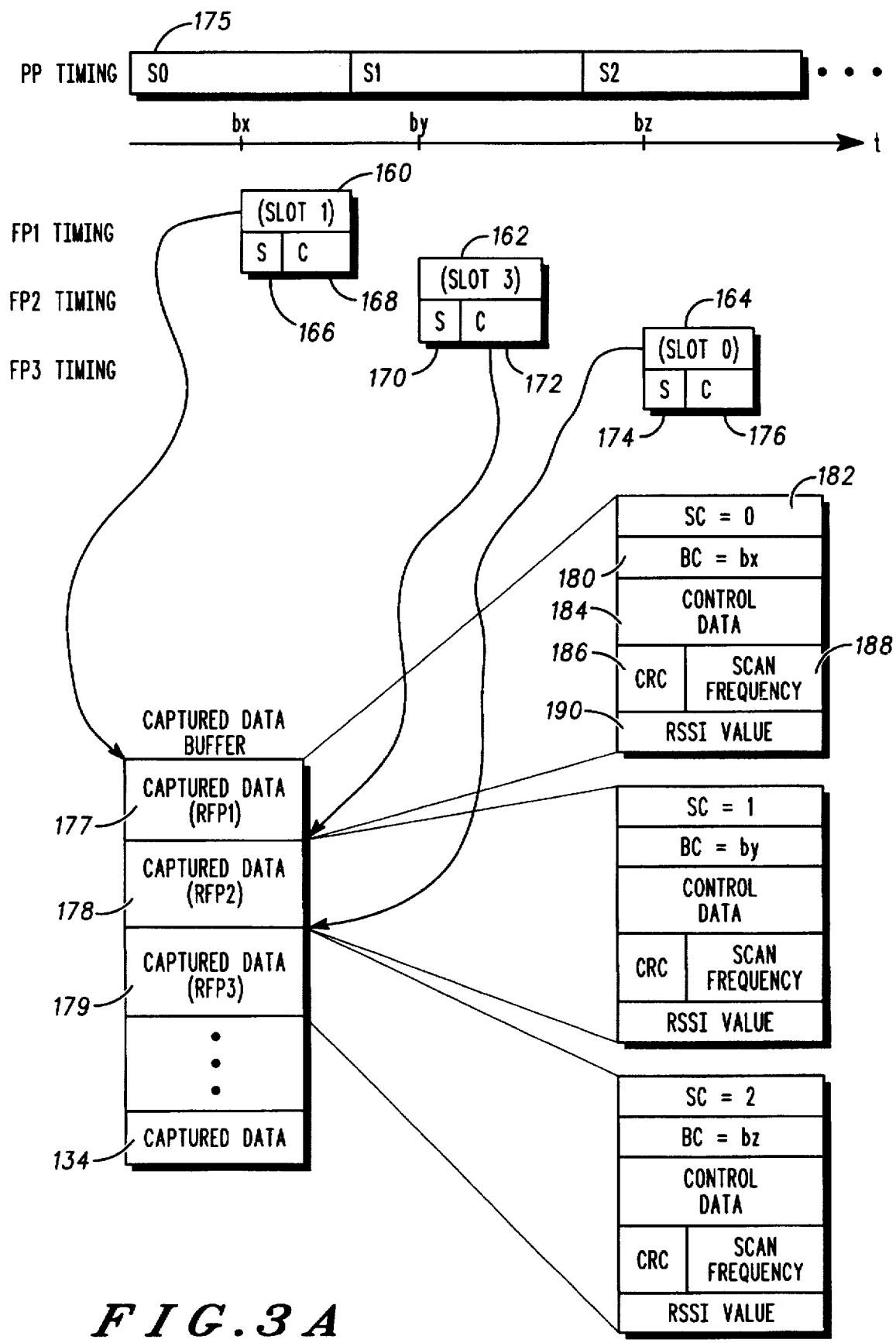
FIG. 3A is a diagram illustrating control channel transmission in the telecommunication system of FIG. 1 and organization of the captured data buffer of the cordless telephone handset of FIG. 2.

FIG. 3A is a diagram illustrating control channel transmission in the telecommunication system 100 of FIG. 1 and illustrating organization of the captured data buffer 134 of the cordless telephone handset 120 of FIG. 2. Each of the base stations 102, 104, 106 transmits a control channel signal. Base station 102 transmits control channel 160; base station 104 transmits control channel 162; and base station 106 transmits control channel 164. Each base station 102, 104, 106 transmits its control channel during one predetermined slot. In the example of control channel transmission in accordance with the DECT protocol, the transmitted control information includes identity information which allows determination of access rights. From the identity information, the handset can determine if it has access rights to the base station. The transmitted information also includes system capability information.

The data included in these control channels is written in the captured data buffer 134 by the TDMA controller 126. Each control channel comprises a plurality of bits. The transmitted bits are organized in slots, each slot being a known number of bits in length. The slots are further organized, for example, as frames, each frame containing a predetermined number of slots. The frames may be further organized as superframes (according to the PHS protocol) or as multiframes (according to the DECT protocol), each superframe or multiframe including a predetermined number of frames.

The handset 120 receives the control channel signals 160, 162, 164 transmitted by the base stations 102, 104, 106. To become synchronized with one of the base stations 102, 104, 106, the handset 120 must obtain bit, slot, frame and superframe or multiframe synchronization with the respective transmitting base station. Bit synchronization occurs when the handset correctly identifies the transmission timing of each bit. Slot synchronization occurs when the handset correctly identifies boundaries between respective slots. Frame synchronization occurs when the handset correctly identifies boundaries between respective frames. Multiframe or superframe synchronization occurs when the handset 120 correctly identifies boundaries between respective multiframes or superframes. Once the handset 120 obtains synchronization with one of the base stations 102, 104, 106, a telephone call or other communication may be established between the handset 120 and the respective base station.

In the exemplary illustration of FIG. 3A, base station 102 broadcasts a control channel 160 beginning at a time corresponding to transmission of a bit designated $b_x$ in slot S0. Base station 104 broadcasts a control channel 162 beginning at a time corresponding to transmission of a bit designated by in slot S1. Base station 106 broadcasts a control channel 164 beginning at a time corresponding to transmission of a bit designated $b_z$ in slot S2. Thus, the three base stations 102, 104, 106 are broadcasting control channels 160, 162, 164 asynchronously.

The handset 120 awaits receipt of a control channel broadcast by a base station by searching for an S-field. Control channel 160 includes an S-field 166 and control data 168. Control channel 162 includes an S-field 170 and control data 172. Control channel 164 includes S-field 174 and control data 176. Generally, the S-fields 166, 170, 174 are used by the handset 120 for identifying a received signal. In a DECT system, the S-field is referred to as the synchronization field. In a PHS system, the S-field is referred to as the unique word. After the handset 120 identifies an S-field, the handset 120 stops searching for the S-field and the TDMA controller 126 (FIG. 2) begins storing in the captured data buffer 134 the control data received following the S-field. After the control data is stored, the handset 120 restarts searching for the next S-field.

FIG. 3A also shows handset (PP) timing 175 for the handset 120 relative to base station (FP) timing for control channel transmission by base stations 102, 104, 106, respectively. The handset (PP) timing includes a sequential scan by the handset 120 of allocated communication slots and frequencies. For example, according to the DECT protocol, communication between a base station and the handset 120 can occur on any one of 24 slots or 10 radio frequencies. The TDMA controller 126 of the handset 120 scans each frequency during the duration of one of the time slots S0, S1, .... During each of slots S0, S1, ..., the TDMA controller 126 searches for radio signals received by the receiver 124 on a predetermined frequency. The TDMA controller 126 stores received data in the captured data buffer 134.

As exemplified, in FIG. 3A, base station 102 (FIG. 1) transmits a control channel 160 during slot S1. S1nce timing of the base station 102 and timing of the handset 120 timing are not synchronized, the handset 120 detects the control channel 160 during handset slot S0 and bit count $b_x$. Subsequently, the handset 120 detects control channel 162 from base station 104 corresponding to slot S3 during handset slot S1 and bit count $b_y$. The handset 120 then detects control channel 164 from base station 106 corresponding to slot S0 during handset slot S2 and bit count $b_z$.

The TDMA controller 126 writes the data received from the control channel in the captured data buffer 134. For example, transmission according to the DECT protocol includes the transmitting base station's identity information and system capability. The data received during handset slot S0 is written in entry 177 of captured data buffer 134. S1milarly, the next data received, during handset slot S1, is written in entry 178 of captured data buffer 134 and data received during handset slot S2 is written in entry 179 of captured data buffer 134.

As is further illustrated in FIG. 3A, each of entries 177, 178, 179 comprises a plurality of memory storage locations or fields. For example, entry 177 includes a slot count field 182 which stores a slot count ("SC") corresponding to the handset slot (S0, S1, ...) during which the data stored in the entry was received and stored by the TDMA controller 126. Entry 177 further includes a bit count field 180 which stores a bit count ("BC") corresponding to handset bit count (B0, B1, .....) during which the data stored in the entry was received and stored by the TDMA controller 126. Still further, entry 177 includes a control data field 184 for storing control data which contains control and identification data from the base station. Still further, the entry 177 includes a CRC field 186 which stores a cyclical redundancy check or CRC status determined by the TDMA controller 126 (FIG. 2). The CRC field 186 is, for example, a single storage location which stores either a first value indicating "CRC good" or a second value indicating "CRC bad." Still further, entry 177 includes a frequency field 188 which stores a value indicating the frequency scanned by the TDMA controller 126. The slot count, bit count and the frequency form an associated location parameter for the entry defining the entry's timing location. Still further, entry 177 includes a RSSI field 190 which stores the received signal strength indication (RSSI) provided by received signal strength indicator 138 (FIG. 2).

In some cases, such as in a residential area, transmissions from one of the respective base stations 102, 104, 106 are not synchronized with transmissions from one or more other base stations 102, 104, 106. In particular, transmission of the respective control channels 160, 162, 164 may not be synchronized with transmission of one or more other of the control channels 160, 162, 164. Also, timing of the control channels broadcast by the respective base stations 102, 104, 106 can drift relative to the timing of control channels 160, 162, 164 broadcast by other base stations 102, 104, 106. That is, control channel timing which is not synchronized with another control channel can vary relative to timing of other control channels. As a result, the timing of more than one control channel can overlap.

Figure 3B:
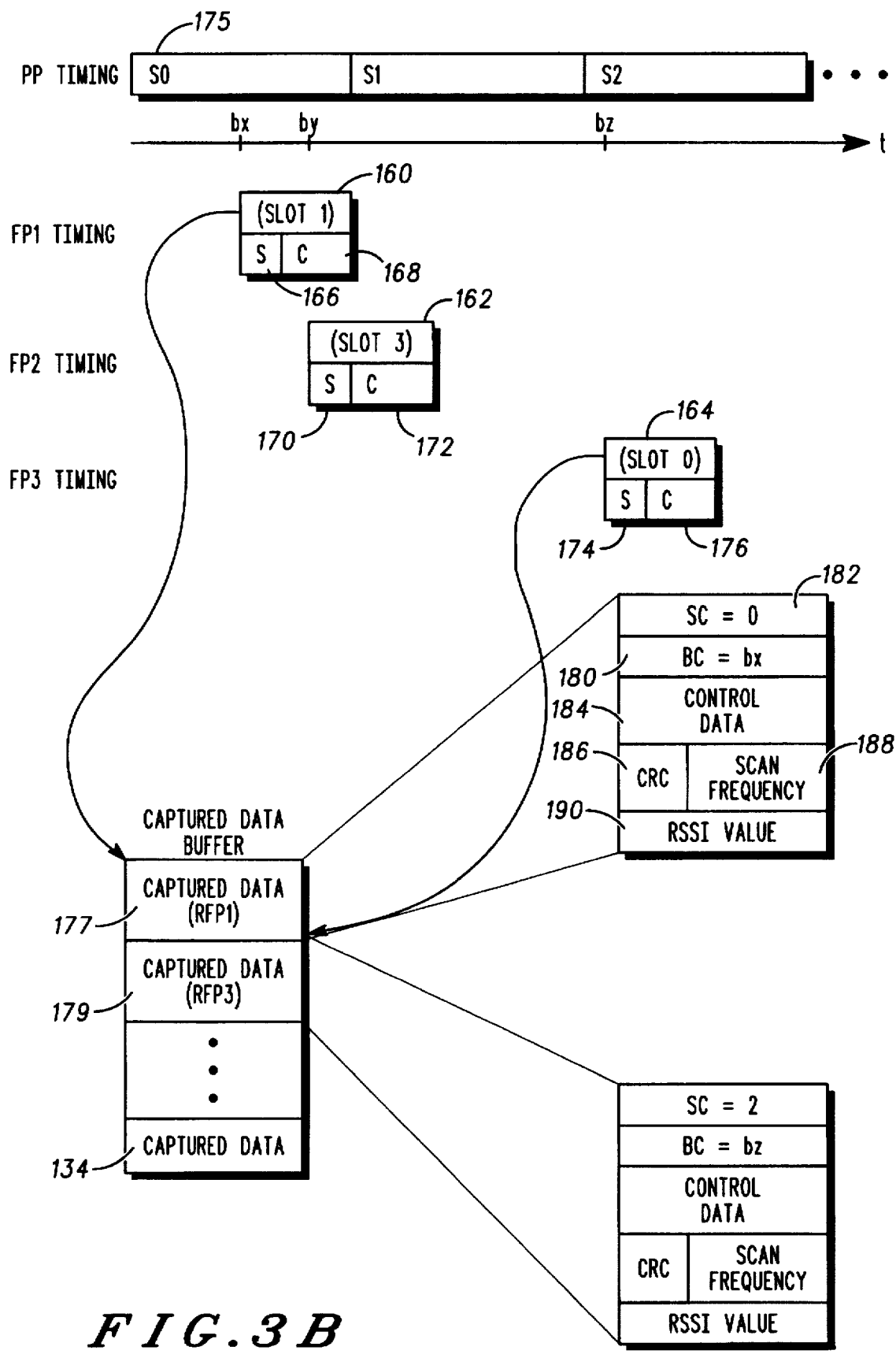
FIG. 3B is a diagram similar to FIG. 3A but illustrating control channel overlap.
Figure 5A:
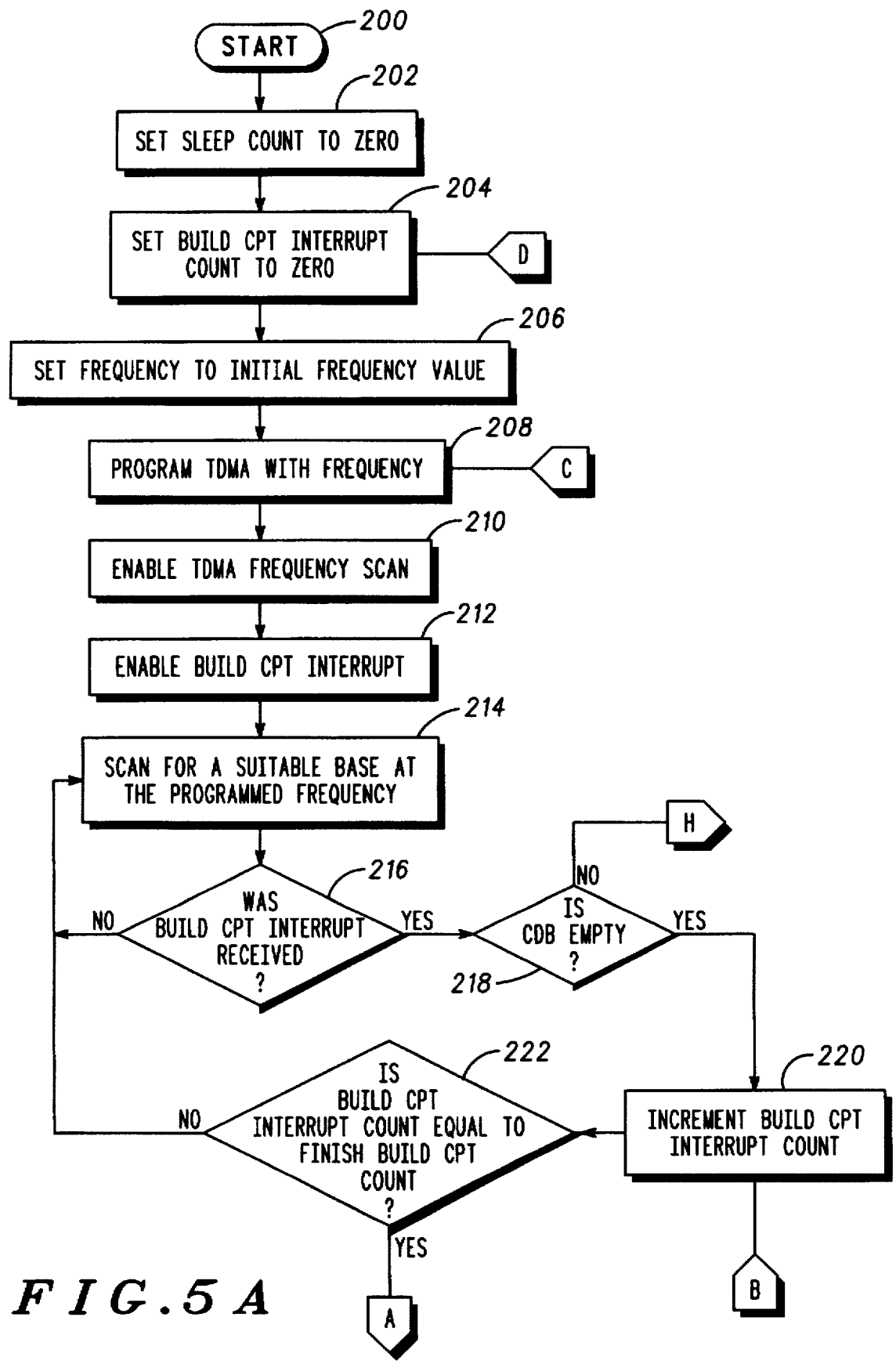
FIG. 5 is a flow diagram illustrating operation of the handset of FIG. 2 for identifying a suitable base station among the base stations of the telecommunication system of FIG. 1 in response to data received from the base stations and stored in the captured data buffer of FIG. 3.
Figure 5B:
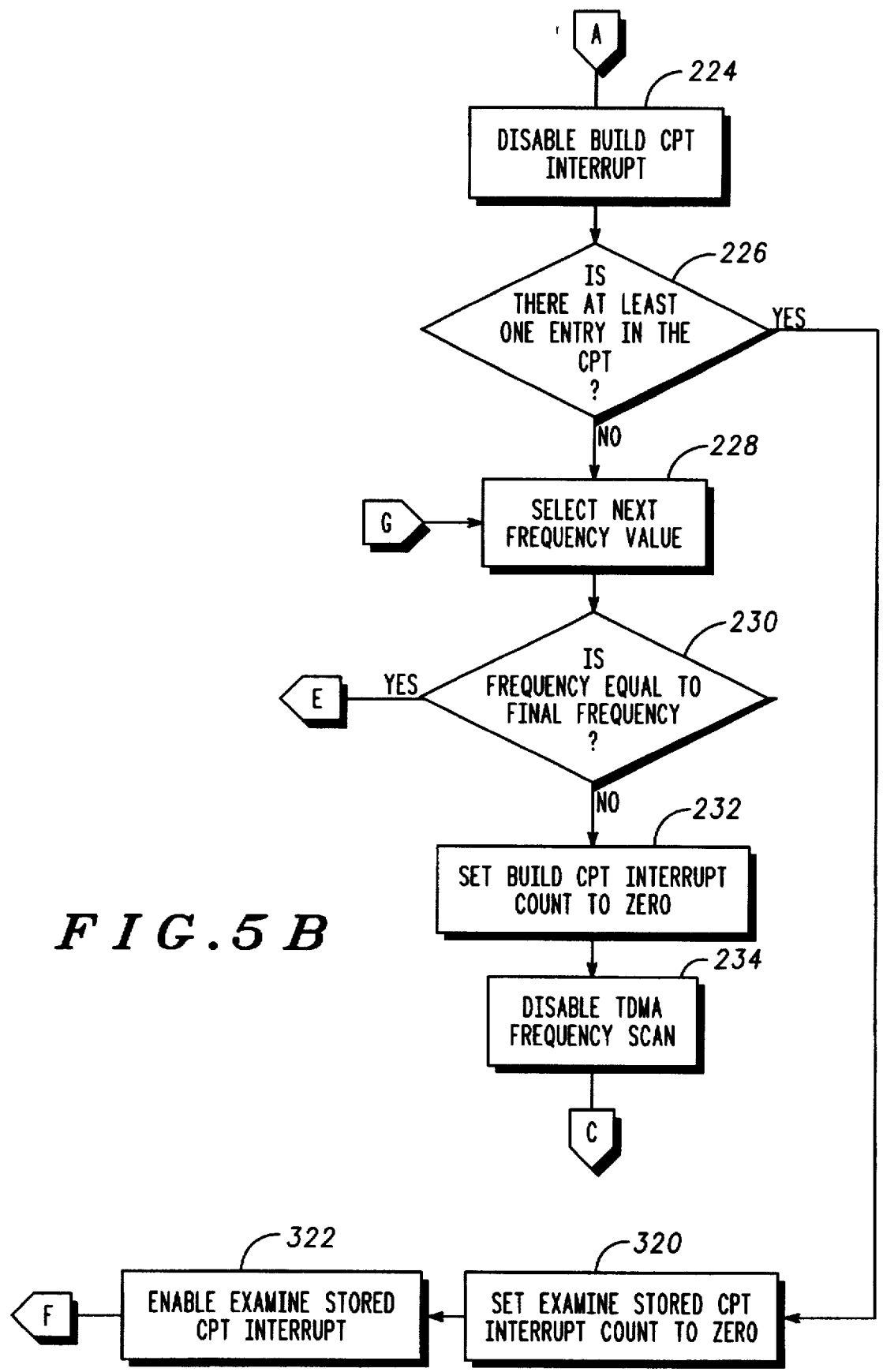
Figure 5C:
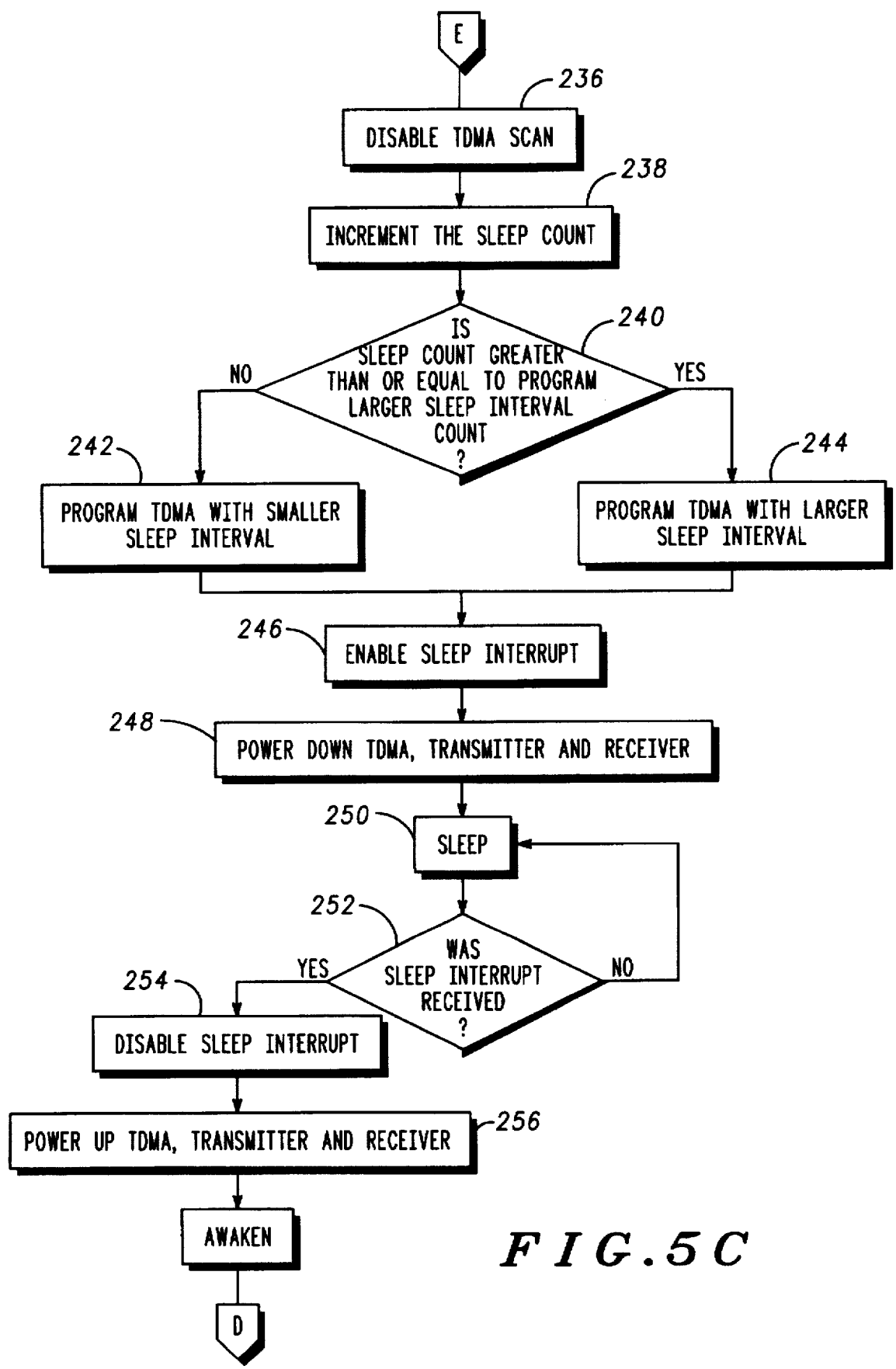
Figure 5D:
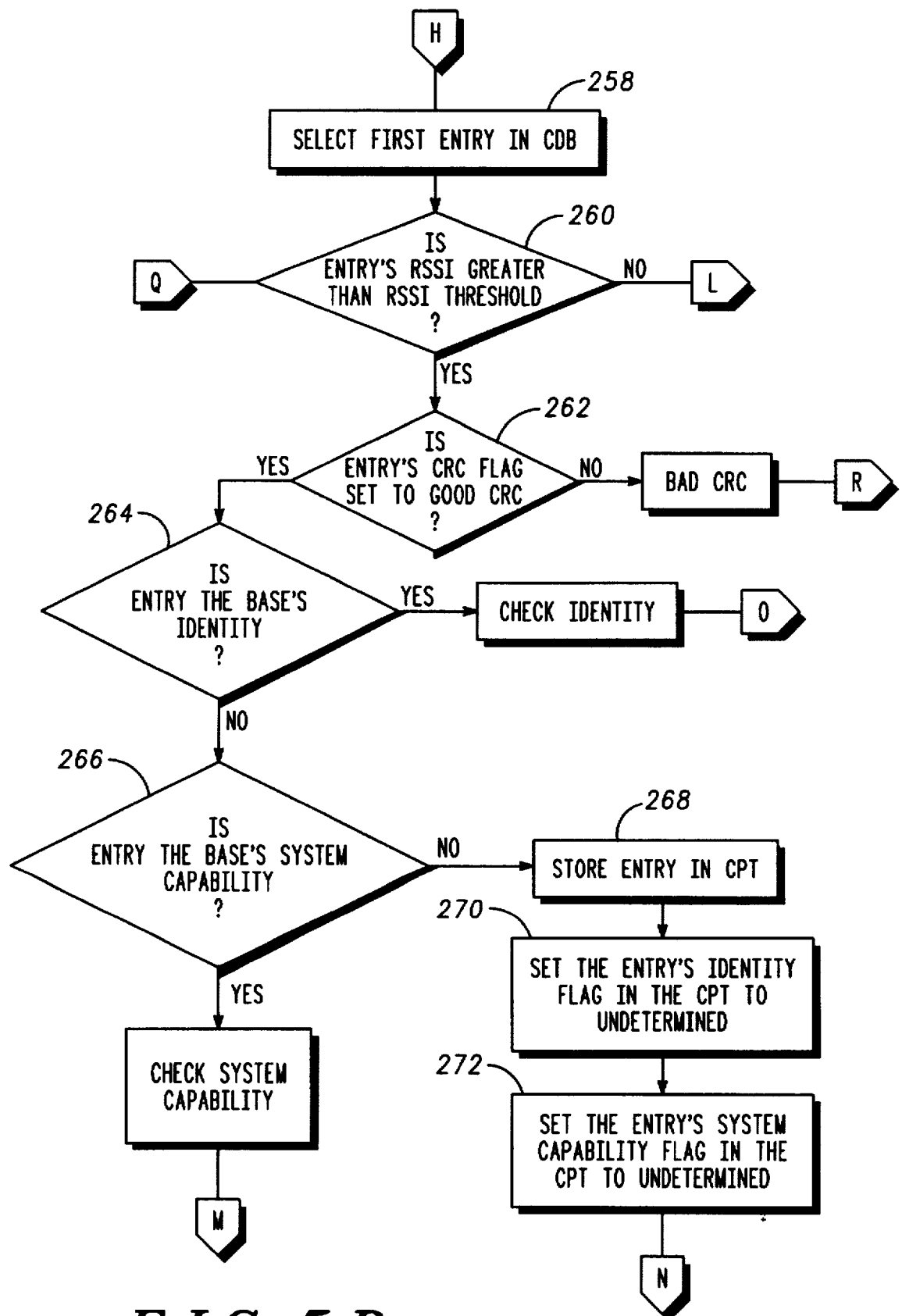
Figure 5E:
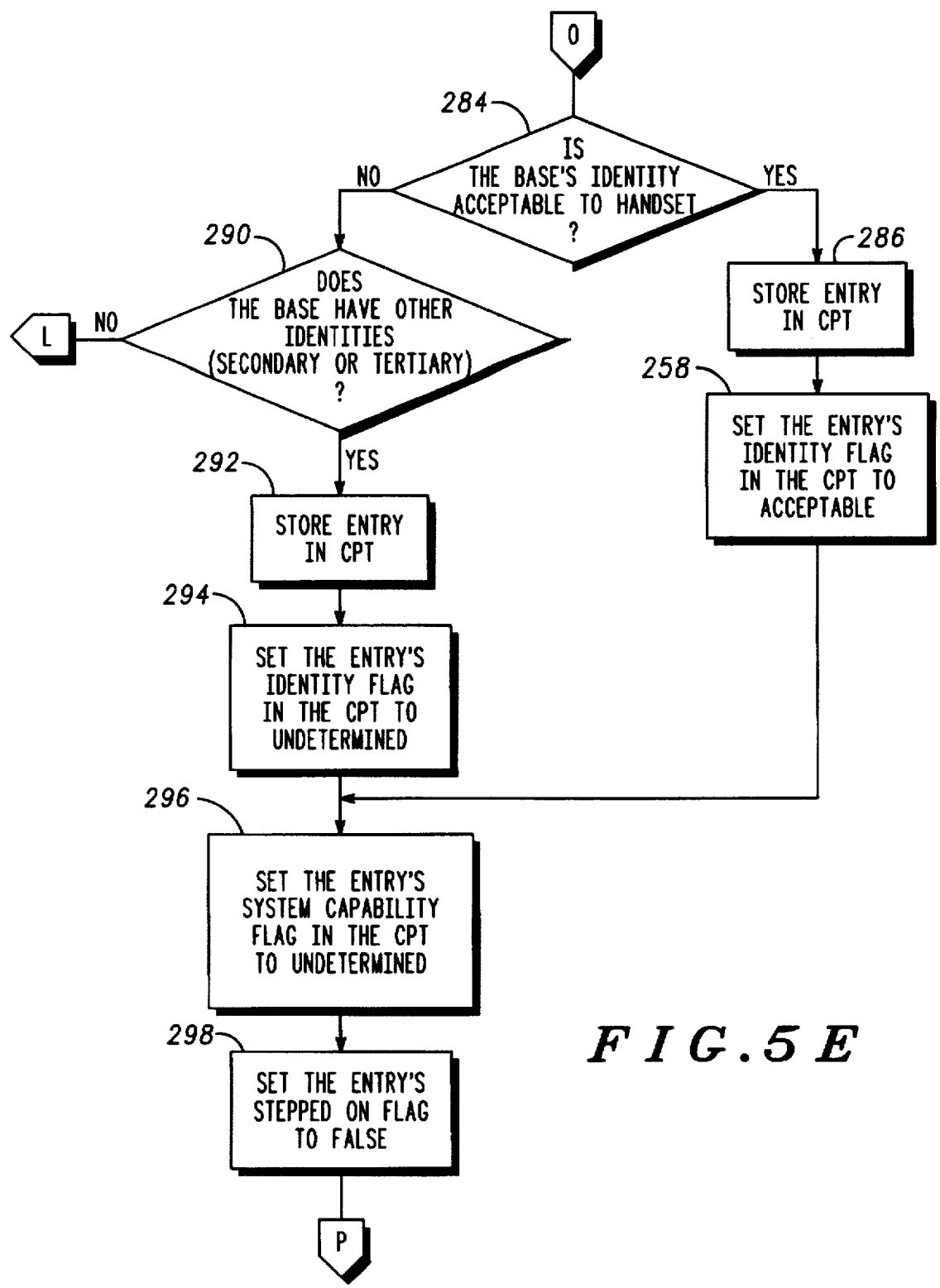
Figure 5F:
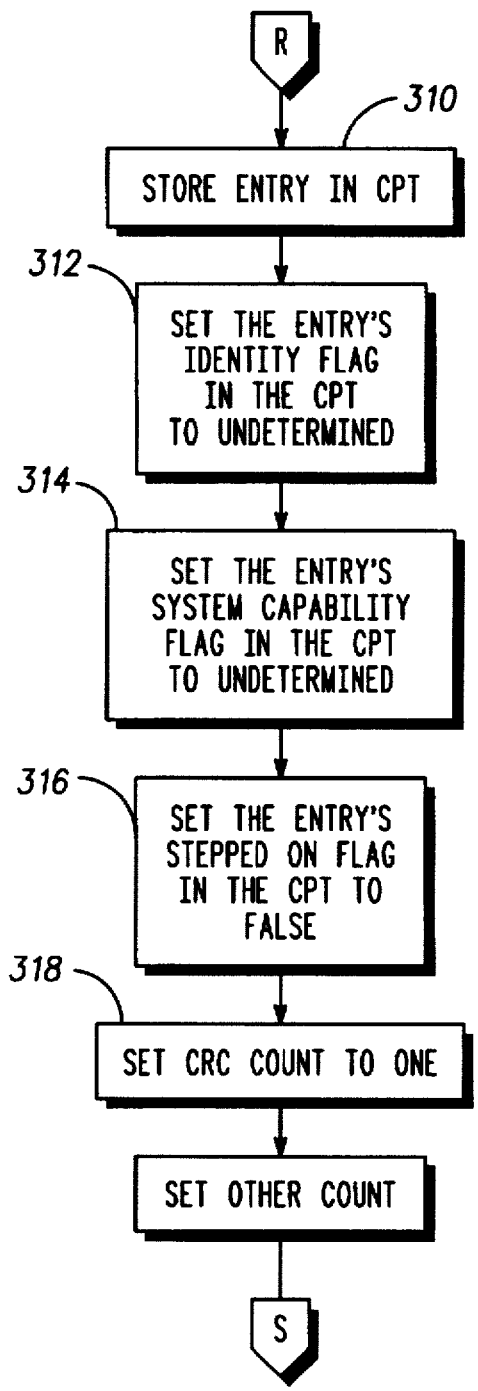
Figure 5G:
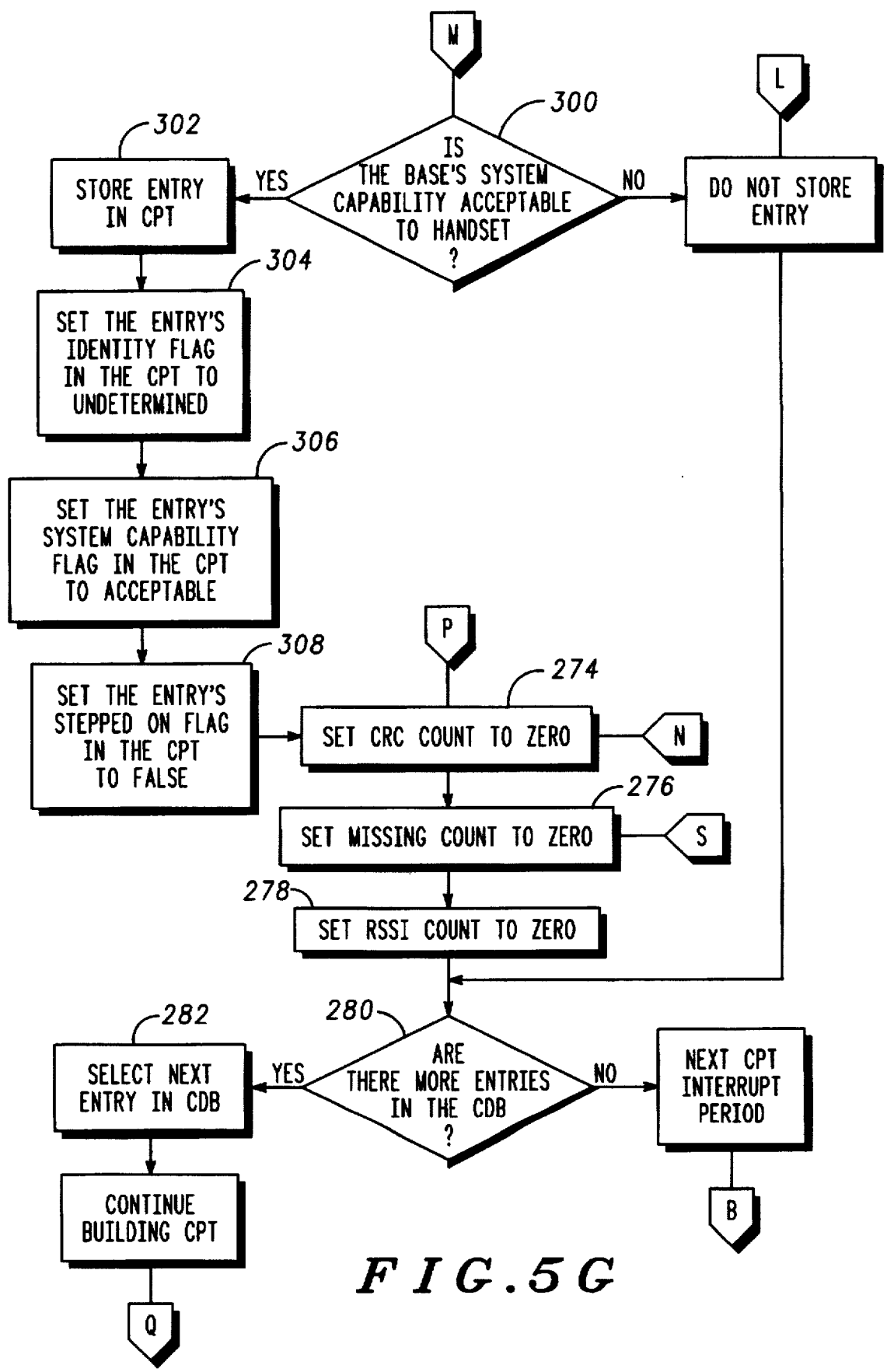
Figure 5H:
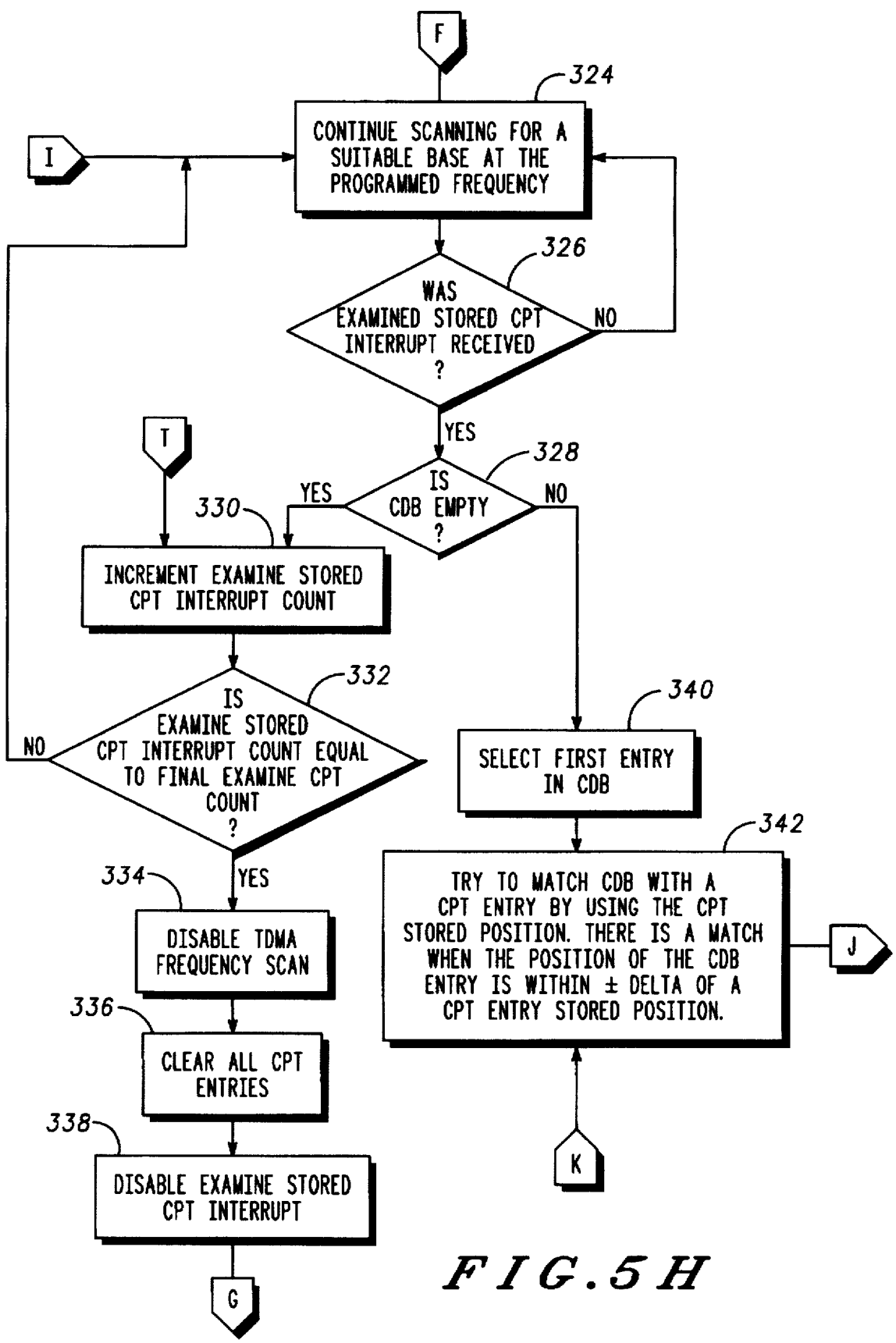
Figure 5I:
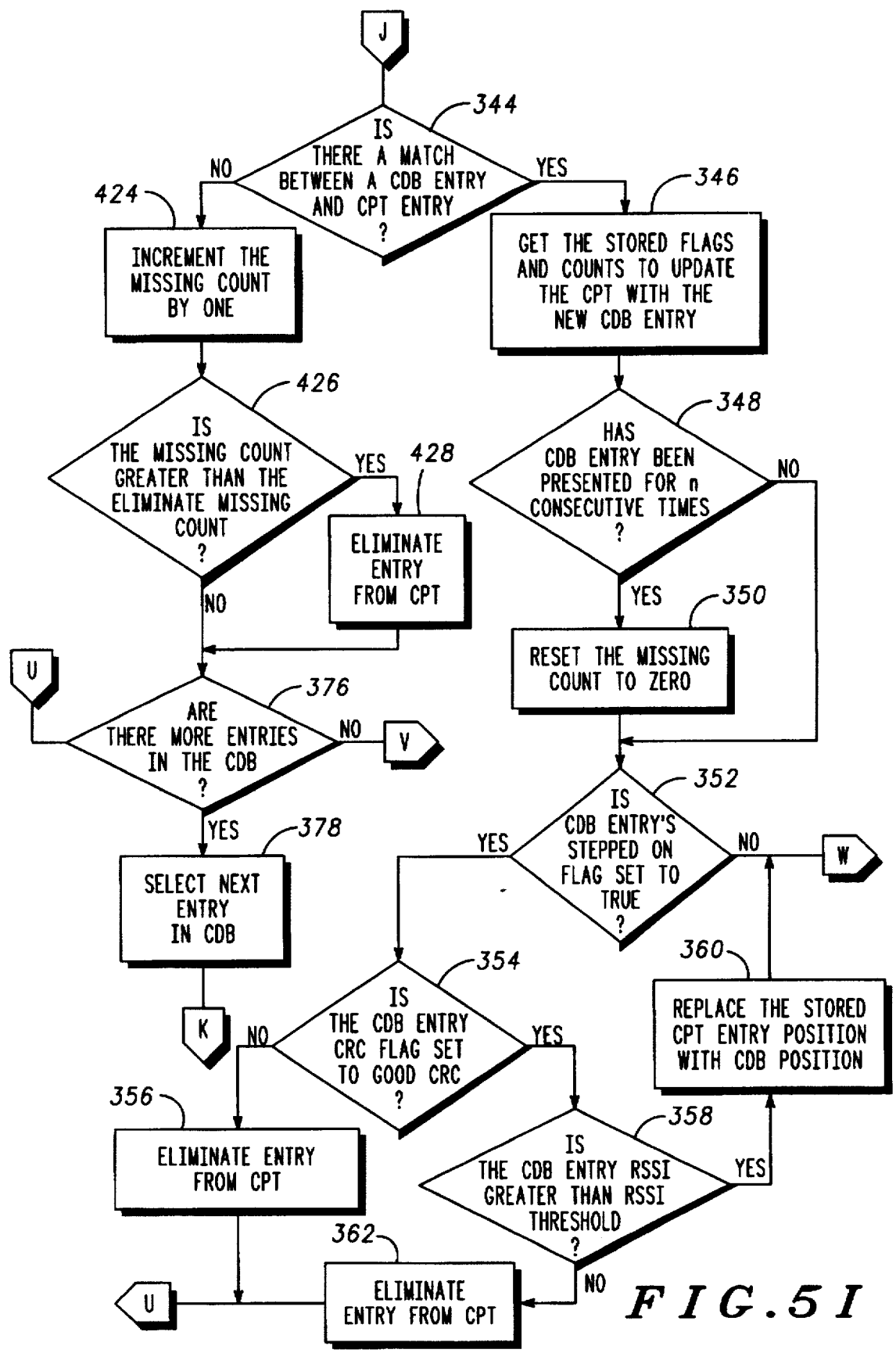
Figure 5J:
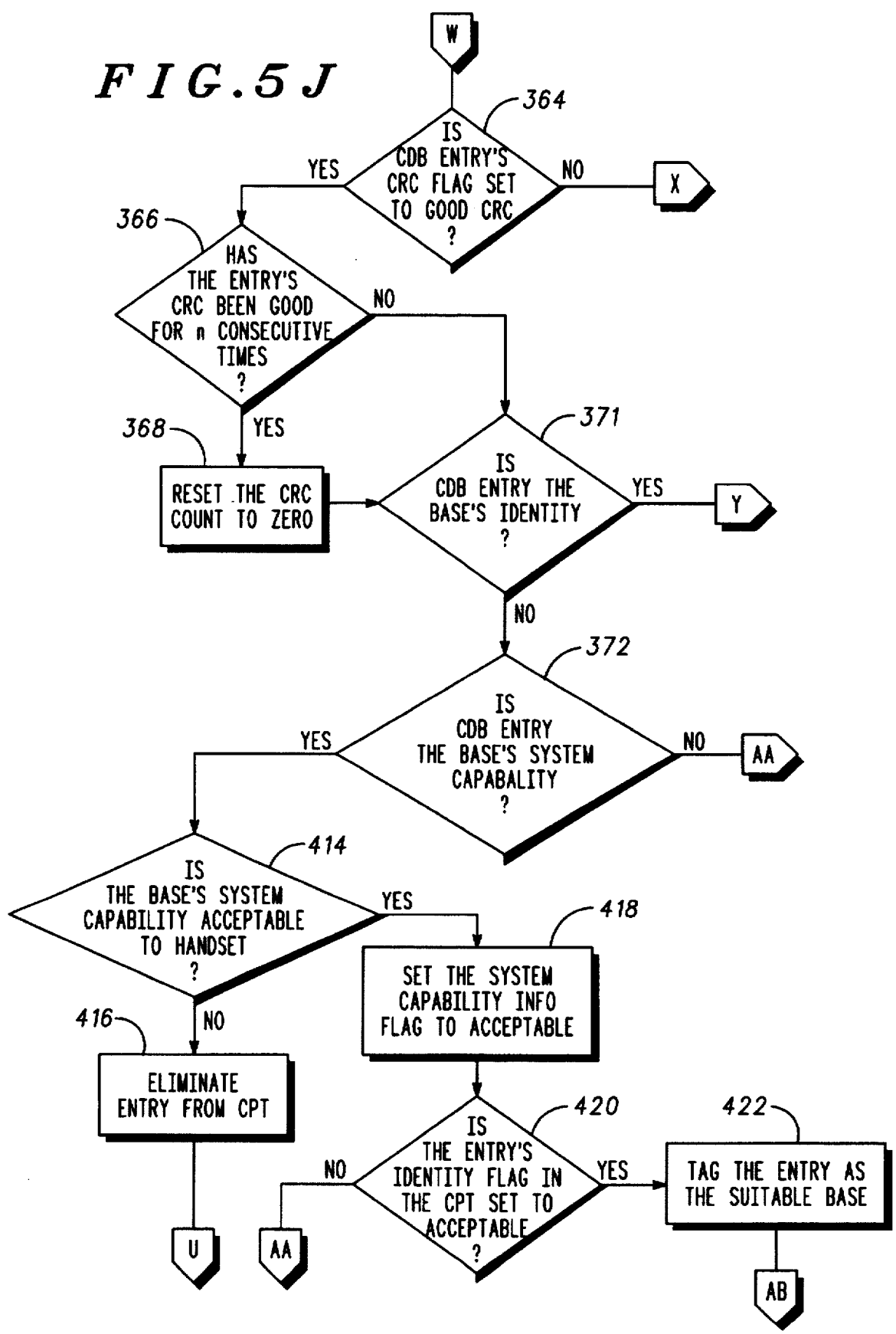
Figure 5K:
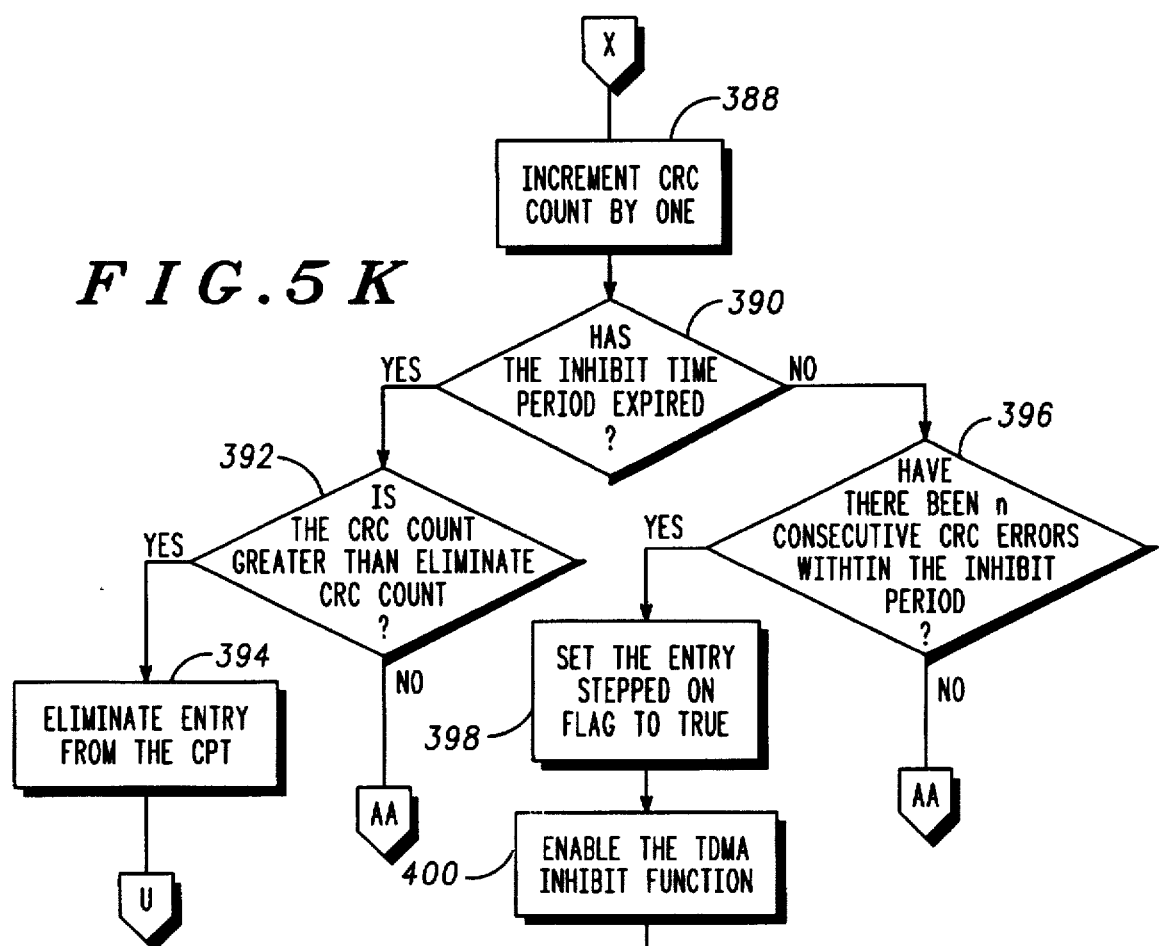
Figure 5L:
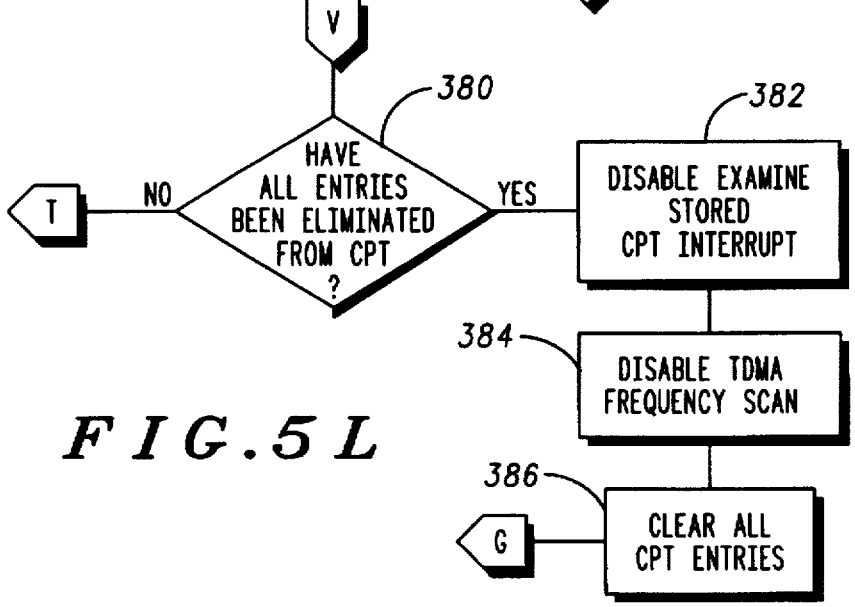
Figure 5M:
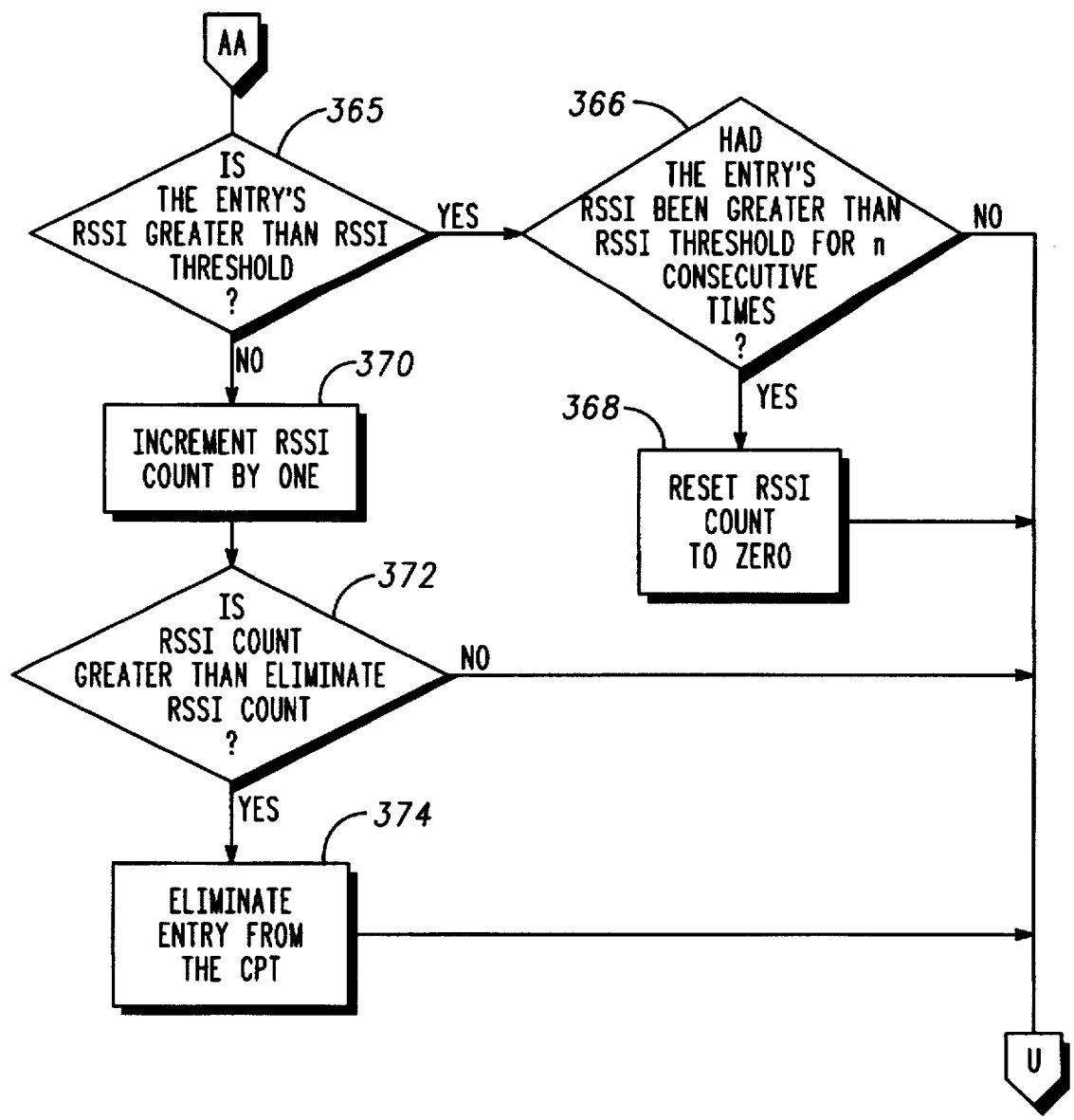
Figure 5N:
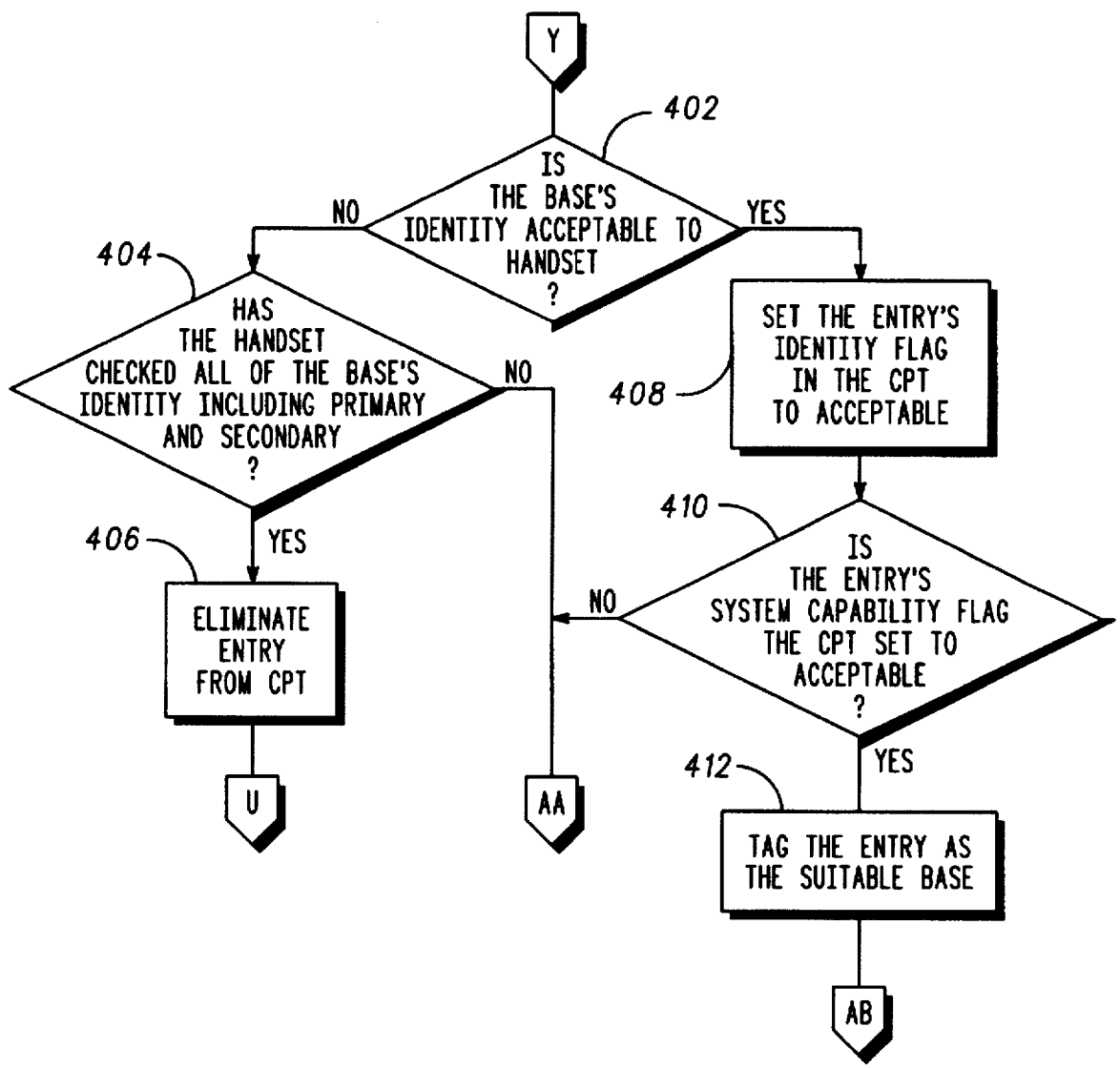
Figure 50:
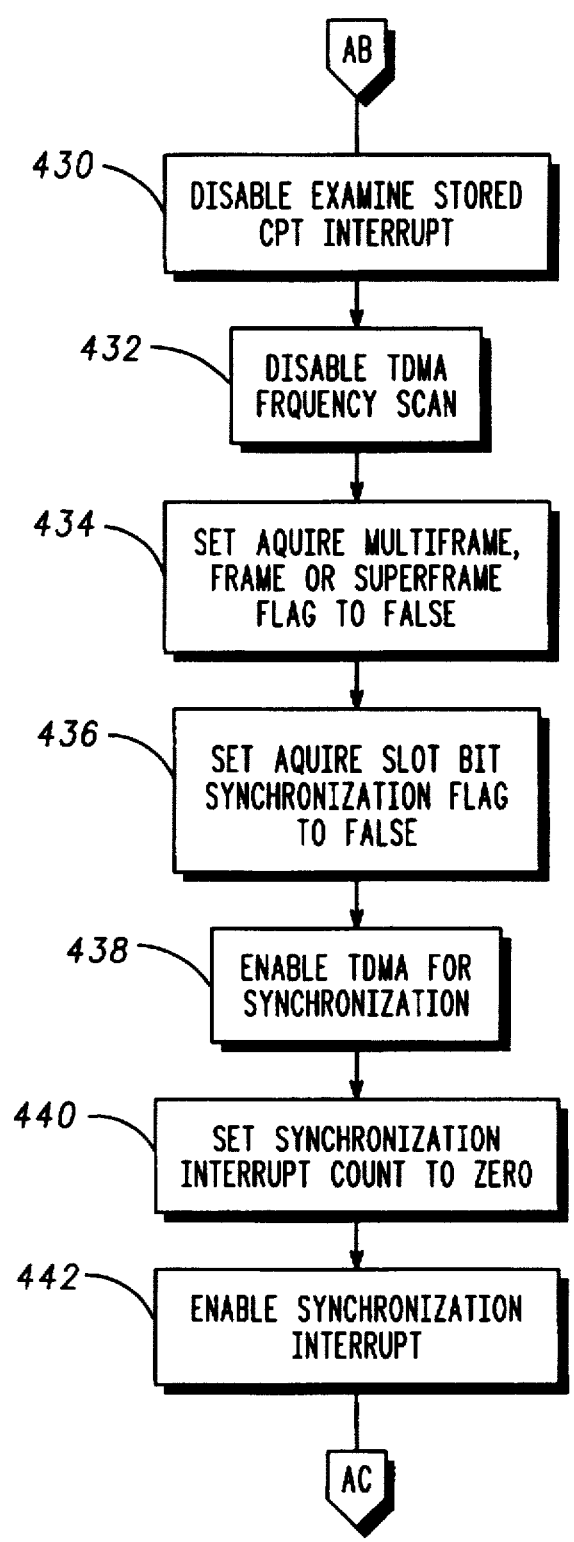
Figure 5P:
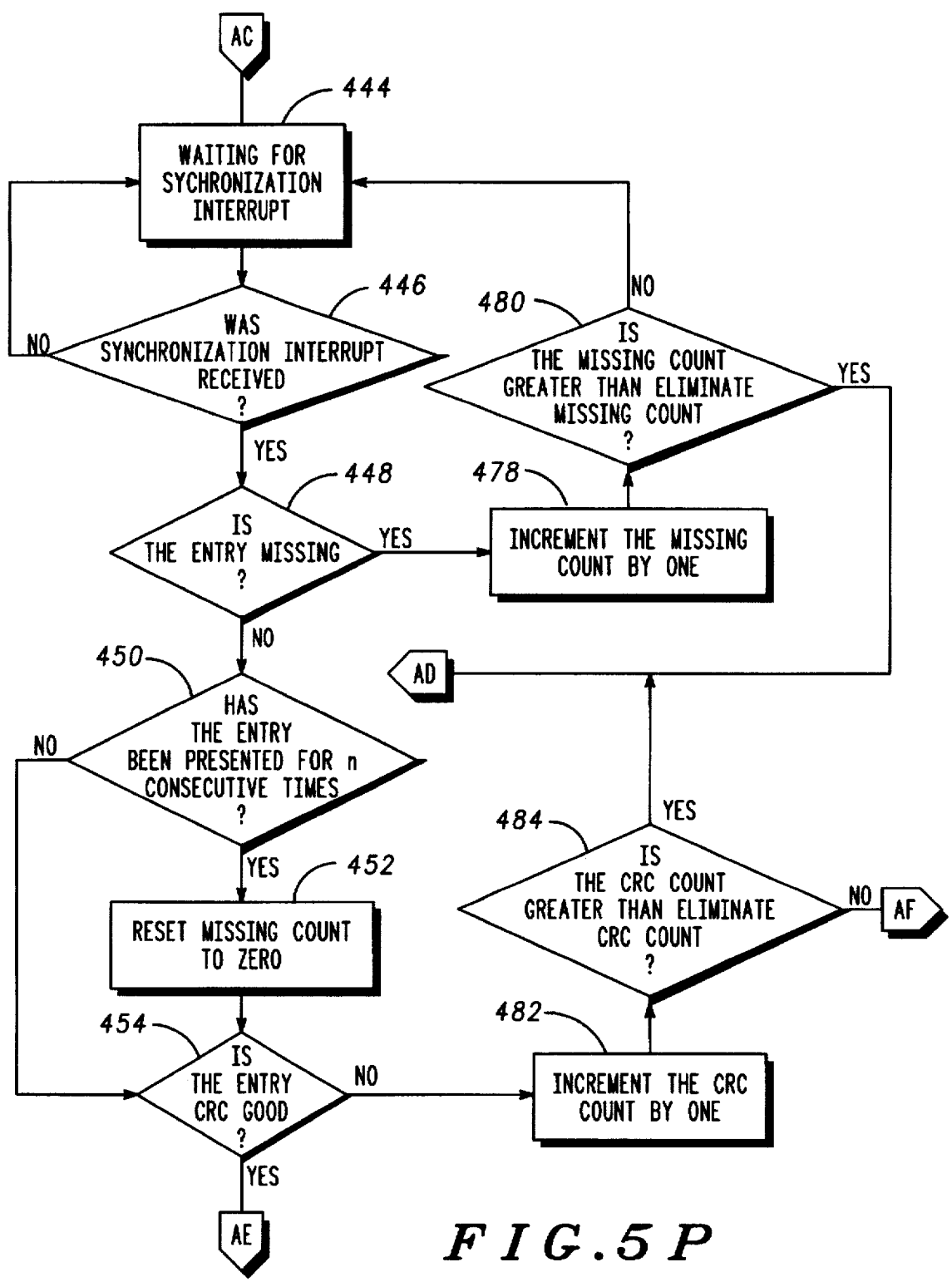
Figure 5Q:
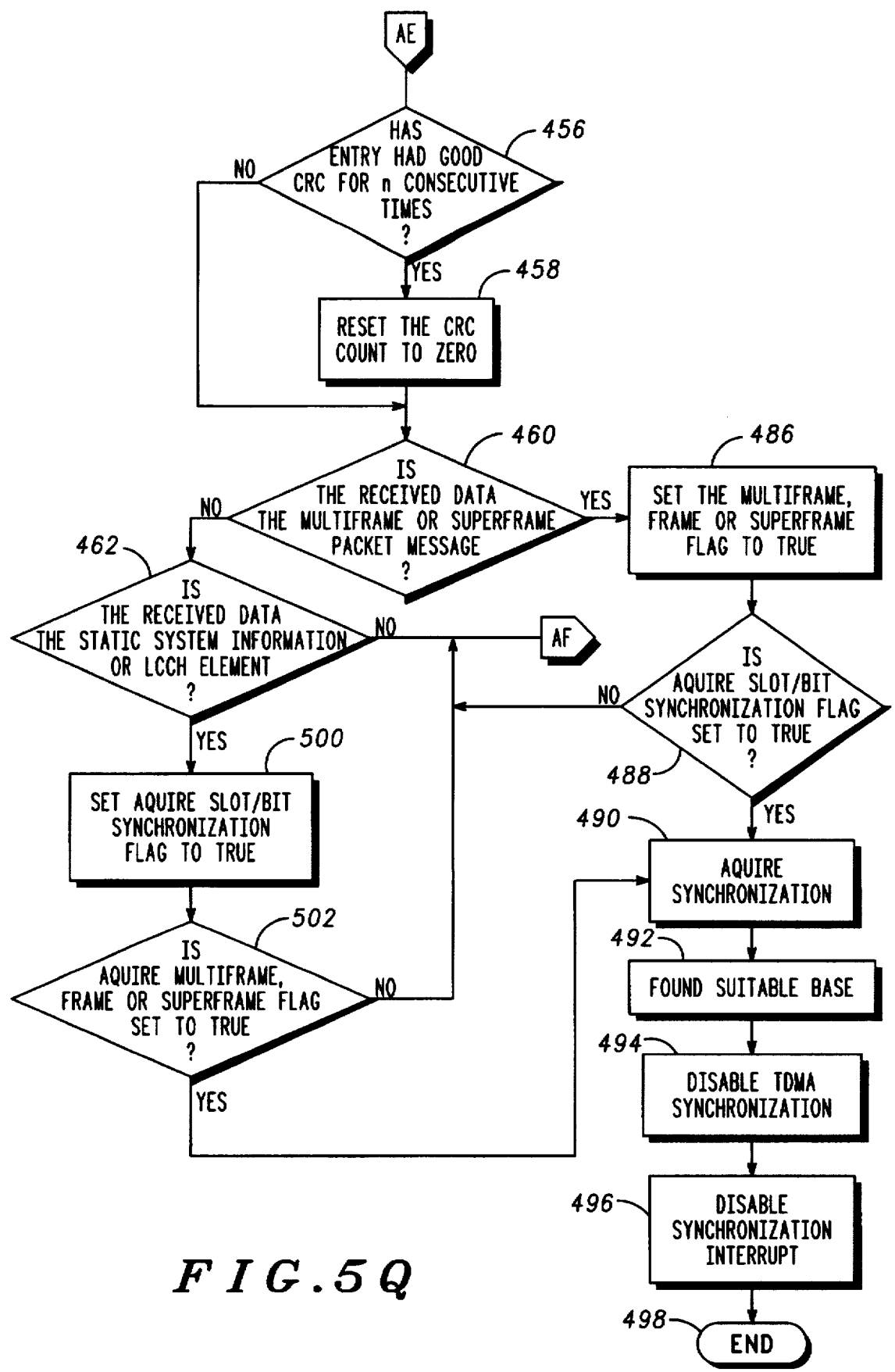
Figure 5R:
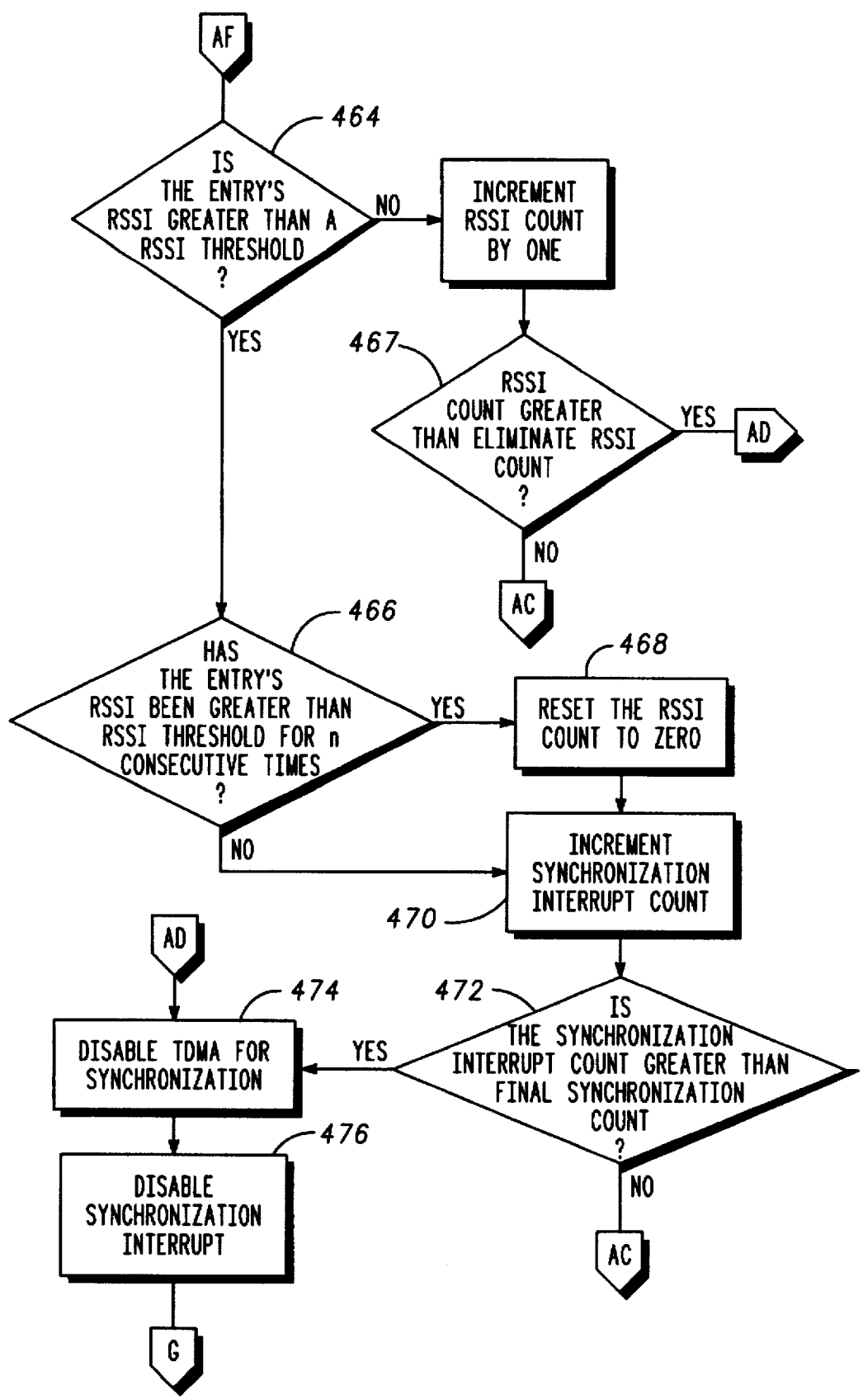

Control channel timing overlap is illustrated in FIG. 3B. In FIG. 3B, base station 102 broadcasts control channel 160 beginning at handset slot S0 and bit $b_x$. Base station 104 broadcasts control channel 162 beginning at handset slot S0 and bit by. The handset 120 detects the S-field 166 of the leading control channel 160, ceases searching for an S-field and begins storing the control data 168 associated with the S-field 166. Because the handset 120 is not searching for another S-field while it receives the control data 168, the handset 120 misses S-field to corresponding to the lagging control channel 162. This can be true even when the received signal strength of the lagging control channel 162 (measured at the handset 120) is much greater than the received signal strength of the leading control channel 160.

Because of the overlap of control channels 160 and 162, the handset fails to detect control channel 162. Upon detecting S-field 166 of control channel 160, the TDMA controller 126 (FIG. 2) writes the data received from control channel 160 in entry 177 of captured data buffer 134. When the TDMA controller 134 detects the S-field 166, the TDMA controller 126 stops searching for an S-field and begins storing control data 168. As a result, the TDMA controller 126 does not detect S-field 170 of control channel 162. The overlapping presence of control channel 162 interferes with accurate reception of control channel 160 and will cause errors in reception which will be detected by the handset 120 as CRC errors.

Control channel overlap can result in interference and improper operation of the telecommunication system 100. Control channel 160, whose timing leads the timing of control channel 162, effectively blocks reception of control channel 162 by the handset 120. Such an overlap condition can occur when the handset 120 is located within range of two base stations, as is the case with handset 108 in FIG. 1. Inability to synchronize with the lagging control channel 162 will prevent the handset 120 from making outgoing calls or receiving incoming calls through the base station 104 which broadcasts the lagging control channel 162. As will be described below, the present invention detects and adapts to such overlapping control channel conditions.

Referring again to FIG. 3A, each of the fields 180, 182, 184, 186, 188, 190 may include a plurality of storage locations and may, for example, be several bytes or more long. In addition, if signal quality is poor or inconsistent or for other reasons, some of the values included in entries 177, 178, 178 may not be stored by TDMA controller 126 or may be set to predetermined default values.

In accordance with the present invention, the data stored by the TDMA controller 126 may be used for determining the suitability of a base station for initiation of communication and when re-synchronizing to a new base station. Some of the data stored in the captured data buffer 134 may be received from one of the base stations 102, 104, 106 which lacks the correct access rights for the handset 120. If the handset has access rights for the base station, the handset can communicate with the base station. Some of the data may be received from one of the base stations which lacks correct system capability for the handset 120. Some of the data may be received from one of the base stations which has weaker received signal strength than another base station, but whose control channel timing leads the control channel timing of the other, stronger base station. In each case, the handset 120 according to the present invention will reject the base station which transmitted the received data as being an unsuitable base station.

According to the present invention, the handset 120 will periodically scan for a suitable base station. As used herein, a "suitable" base station is one with received signal strength greater than a predetermined threshold and an identity and system capability which are acceptable to the handset 120. If a suitable base station is not found, then the handset 120 enters a sleep mode for a given time period. When the sleep time ends, the handset 120 will again scan for a suitable base station. After repeated unsuccessful scans, the sleep time will change to a longer duration to further conserve power in the battery 133. If a suitable base station is found in accordance with the invention, the handset 120 will then obtain synchronization with the suitable base station. After synchronizing, the handset 120 will collect all other necessary system information. For example in a DECT system, this includes static system information and multiframe number. At that point, the handset 120 will be locked to the base station.

The method for initializing communication between a handset and a base station in a telecommunication system, in accordance with the present invention, will be discussed in detail below in conjunction with FIG. 5. The method begins by initializing the handset 120 to scan for a suitable base station by sequentially scanning all available frequencies. Thus, for example, when implemented in accordance with the DECT protocol, the handset 120 scans all 10 DECT frequencies. When implemented in accordance with the PHS protocol, the handset 120 may scan all PHS predetermined control frequencies.

The handset 120 scans for data broadcast in a control channel or beacon by any base station of a plurality of base stations in the telecommunication system. The base stations may broadcast all necessary control information in a single transmission. Or the base stations may broadcast all necessary control information in a series of transmissions. For example, in a DECT system, the base stations may broadcast the base station's system capability in a first transmission, the base station's identity in a second transmission. Thus, to obtain all necessary control information, the handset 120 receives a plurality of control channel signals, each control channel signal of the plurality of control channel signals being broadcast by a respective base station, each control channel signal including a respective control field for the respective base station. The handset stores each transmission including the respective control field as a separate entry in the captured data buffer 134. The data stored in each of these entries must be evaluated.

Following initialization, the handset identifies base stations as candidate base stations when one or more base station's stored control data satisfy a predetermined criterion. The handset places in the candidate profile table 136 certain received control channel information which has been stored in the captured data buffer 134 by the TDMA controller 126. An entry from the captured data buffer 134 will be added to the candidate profile table 136 if the received signal strength for the entry is greater than a given threshold, if the entry includes an identity which is acceptable for the handset 120 to access the base station, or if the entry includes system capability which is acceptable to the handset 120. If the entry satisfies one or more of these requirements, then the position (slot and bit count) of the base station which originated the entry is entered in the candidate profile table 136.

FIG. 4 is an illustration of a candidate profile table 136 for use in conjunction with the cordless telephone handset of FIG. 2. As illustrated, the candidate profile table includes storage locations for control data, logical flags and other information used by the processor 128 for identifying a suitable base station. The candidate profile table (CPT) 136 includes a slot count 189 and a bit count 191 of a base station identified as a candidate suitable suitable base station. The CPT 136 further includes an RSSI count 192, which is the number of times the received signal strength for the candidate suitable base station has been unacceptable. The CPT 136 further includes a CRC count 193, which is the number of times the cyclical redundancy check for the candidate suitable base station has been unacceptable. The CPT 136 further includes a missing count 194, which is the number of times the candidate suitable base station has been missing from its expected "location," i.e., slot count and bit count. The CPT 136 still further includes an identity flag 195 which is a logical flag set if the candidate suitable base station has an identity acceptable to the handset. The CPT 136 still further includes a system capability flag 196 which is a logical flag set if the candidate suitable base station has system capability acceptable to the handset. The CPT 136 still further includes an acquire slot/bit synchronization flag 197 which is a logical flag set when the handset acquires slot and bit synchronization with the candidate suitable base station. The CPT 136 still further includes an acquire multiframe or superframe flag 198, which is a logical flag set when the handset acquires multiframe or superframe synchronization with the candidate suitable base station. The CPT 136 still further includes control data 199 received from the candidate suitable base station.

All the entries in the CPT 136 except the control data 199 are typically one byte in length. The control data 199 may be any length. Further, apparatus and method in accordance with the present invention may store some or all of the parameters shown in FIG. 4 in the CPT 136, or may store additional parameters. The stored parameters may vary depending on the communications protocol (such as DECT or PHS) implemented by the telecommunication system 100.

After the handset 120 builds the candidate profile table 136, the handset selects a suitable base station from the candidate base stations. The handset proceeds to resolve each entry in the candidate profile table 136. There are two possible resolutions for each entry in the candidate profile table 136. Either the entry is eliminated as unsuitable or it is selected as a suitable base station. If the base station's control data has been missing from its expected location in the captured data buffer 134 a number of times greater than a predetermined threshold, the entry for that base station will be eliminated from the candidate profile table 136. If the base station's CRC status has been unacceptable a number of consecutive times greater than a given threshold, the entry for that base station will be eliminated from the candidate profile table 136. If the base station's RSSI has been unacceptable a number of consecutive times greater than a given threshold, the entry for that base station will be eliminated from the candidate profile table 136. If the handset 120 has no access rights to the base station, the entry for that base station will be eliminated from the candidate profile table 136. The handset 120 determines whether it has access rights to the base station from the base station's identity. If the handset 120 has no access rights to the base station, then the base station's identity is unacceptable to the handset. If the base station's system capability is unacceptable to the handset 120, the entry for that base station will be eliminated from the candidate profile table 136.

If a base station's entries in the captured data buffer 134 have a predetermined number of consecutive CRC errors, the handset 120 will investigate the possibility that the CRC errors were caused by an undetected base station whose control channel timing overlaps the control channel timing of the base station in the candidate profile table 136. This is the control channel overlap condition described above and could occur, for example, as illustrated in FIG. 3B, where the control channel 160 leads the control channel 162 by an incremental (Δ) time. The handset 120 will enable the inhibit function of the TDMA controller 126, inhibiting reception of the S-field of the leading control channel 160. In this manner, the TDMA controller 126 will be able to detect the lagging control channel 162. If the TDMA controller 126 detects another base station, such as base station 104 which transmitted control channel 162, which has CRC status of "good CRC," the handset 120 will replace the base station entered in the candidate profile table 136 with the newly detected base station 104. If the TDMA controller 126 detects another base station with a CRC status of "bad CRC" or does not detect another base station, the base station entry in the candidate profile table 136 is eliminated.

If, while trying to reach a resolution for all entries in the candidate profile table 136, the handset 120 eliminates all entries from the candidate profile table 136, the handset 120 will increment to the next frequency and begin scanning for control channels. If the handset 120 has scanned all frequencies and eliminated all entries from the candidate profile table 136, the handset 120 will enter sleep mode. Once the sleep mode duration expires, the handset 120 will again try to find a suitable base station. The handset 120 will continue scanning until a suitable base station is found or the handset 120 is powered down.

Once a suitable base station has been found using the data in the candidate profile table 136, the handset 120 will synchronize its time base with the suitable base station. The handset 120 will collect all necessary system information. For example, in a DECT system, the handset will collect static system information and the multiframe number for the suitable base station. Once the necessary system information is collected, the handset 120 will have synchronization with the base station. After collecting the necessary system information, the handset 120 is locked or synchronized to the base station.

If there are consecutive CRC errors while the handset 120 is obtaining synchronization and these CRC errors are greater than a predetermined threshold, the handset 120 enables scanning by the TDMA controller 126. Also, If the base station's RSSI drops below a predetermined RSSI threshold for a consecutive amount of times, the handset 120 enables scanning by the TDMA controller 126. The handset 120 will thus search for another base station and will select another suitable base station by again building a candidate profile table 136 and reaching a resolution for all entries in the candidate profile table 136 using another frequency.

As will be seen hereinafter, the method implemented by the processor 128 to identify a suitable base station requires the use of a number of counters, logical flags, and interrupt signals. These logical values are discussed immediately hereinafter.

The RSSI count is the number of times the base station's received signal strength, as reported by the received signal strength indicator 138 (FIG. 2), is less than a predetermined RSSI threshold.

The Missing count is the number of times an entry for the base station was missing from the captured data buffer 134. The "location" of the base station, i.e., its slot count and bit count, are approximately known from other received entries. The location may vary due to timing drift and other reasons. An entry is missing if no base station is located having correct slot count and bit count, within a predetermined error distance from its previous location.

The CRC count is the consecutive number of times the base station's CRC status was set to an unacceptable value such as "bad CRC" indicating an error in signal reception.

The Sleep count is the number of times the handset has entered the sleep mode. The Sleep count is used to determine the duration of sleep mode.

Program Larger Sleep Count is a count defining when the handset changes the sleep mode's duration from the smaller duration to the larger duration. When the Sleep count is greater than the Program Larger Sleep Count, the handset changes the sleep mode's duration to the larger value.

The Build CPT interrupt count is a counter which counts periodic interrupts during reception of a control channel while the handset is building the candidate profile table. The interrupts cause the processor 128 to check the captured data buffer for a new control channel to add to the candidate profile table 136.

The Finish Building CPT count marks the final interrupt during reception of control data while the handset is building the candidate profile table 136. The final interrupt causes the processor 128 to check the captured data buffer for new control data to add to the candidate profile table 136. After this final build CPT interrupt, the processor 128 will starts examining candidate profile table 136 to select a suitable base station.

The Frequency count is the frequency being scanned by the handset 120. For example, in the DECT protocol, there are 10 frequencies numbered 0 through 9.

The Final Frequency is the maximum frequency. For example, in the DECT protocol, the Final Frequency would be frequency 9.

The Identity flag is a logical flag set which the handset uses to determine that the base station's identity is acceptable to the handset. The base station identity is acceptable when the handset has access rights to the base station. The handset determines it has access rights to the base station from the base station's identity.

The System capability flag is a logical flag set when the handset determines that a base station has acceptable system capability.

The Inhibit Stepped On flag is set if the handset detects a predetermined number (such as two) of consecutive "bad CRC" conditions during an inhibit period.

The Examine Stored CPT interrupt and the Final Examine CPT count are used to force the processor 128 to track past identification.

The Bad CRC count is the number of times the CRC has been unacceptable.

The Bad RSSI count is the number of times the RSSI has been unacceptable.

The Missing count is the number of times a base station has not been at the location (i.e., slot and frequency) expected by the handset.

The RSSI Limit is a threshold value defining the minimum acceptable RSSI level.

The CRC flag is a logical value stored in the captured data buffer defining "good CRC" or "bad CRC." The System Capability flag is set to true if the base station has system capability which is acceptable to the handset.

The Eliminate Missing count is used to eliminate a base station from the candidate profile table if the base station is missing more than a predetermined number of times.

The Multiframe or Superframe flag is set if the handset has received the multiframe or superframe number from the base station.

The Acquire Slot Bit Synchronization flag is set if the handset has acquired both bit synchronization and slot synchronization with the base station.

FIG. 5 is a flow diagram illustrating operation of the handset 120 of FIG. 3 for identifying a suitable base station among the base stations 102, 104, 106 of FIG. 1 in response to data received from the base stations 102, 104, 106 and stored in the captured data buffer 134 of FIG. 5. The method according to the invention begins with step 200. The method is preferably performed by the processor 128 using instruction and data stored in memory 130 (FIG. 2).

The method continues with the initialization of operational variables. These variables may be stored in memory 130. At step 202, a Sleep count is initialized to 0. At step 204, a Build CPT interrupt count is initialized to zero. At step 206, Scan Frequency is initialized to a predetermined initial frequency number. At step 208, the Scan Frequency is provided to the TDMA controller 126, and at step 210, the frequency scan operation of the TDMA controller 126 is enabled. At step 212, the Build CPT interrupt is enable.

The method continues with step 214, where the handset 120 scans for a suitable base station transmitting a control channel at the Scan Frequency. During this step, the TDMA controller 126 writes in captured data buffer 134 all data received at the handset 120 at the Scan Frequency. At step 216, the method determines if a candidate profile table (CPT) interrupt was received. If no CPT interrupt was received, the handset 120 returns to step 214 to continue scanning for a suitable base.

If a CPT interrupt was received, the method continues at step 218. At step 218, the handset 120 determines if the captured data buffer (CDB) 134 is empty. If the CDB 134 is not empty, the method continues with step 258 to build the candidate profile table 136 (FIG. 2). If the CDB 134 is empty, the method continues with step 220 and increments the Build CPT interrupt count.

At step 222, the handset 120 determines if the Build CPT interrupt count is equal to the Finish Build CPT count. If not, the method returns to step 214 to continue scanning for a suitable base. If the Build CPT interrupt count is equal to the Finish Build CPT count, the method continues to step 224 and disables the Build CPT interrupt. Next, at step 226, the method determines if there is at least one entry in the candidate profile table (CPT) 136. If there is, the method continues at step 320 where the method continues to examine entries in the CPT 136.

If the CPT 136 contains no entries, the method proceeds in step 228 to select the next frequency value. At step 230, the method determines if there are more frequencies to scan. In a DECT system, for example, the final frequency may be frequency 10. If the current frequency count is equal to the final frequency, the method continues at step 236. If the current frequency is not equal to the final frequency, at step 232, the handset 120 sets the Build CPT interrupt count to 0 and at step 234, the handset 120 disables the frequency scan operation of the TDMA controller 126. The method then proceeds with step 208.

At step 236, with the current frequency equal to the final frequency (step 230), the handset 120 enters sleep mode. At step 236, the handset disables the frequency scan operation of the TDMA controller 126. At step 238, the handset 120 increments the Sleep count and at step 240, the handset 120 determines if the Sleep count is greater than or equal to the Program Larger Sleep Interval Count. The Sleep count determines the duration of the sleep period, when the handset 120 does not scan for control channels or other signals from one or more of base station. If the Sleep count is less than the Program Larger Sleep Interval Count, at step 242, the handset 120 stores a smaller sleep interval in the TDMA controller 126. If the Sleep count is greater than or equal to the Program Larger Sleep Interval Count, at step 244, the handset 120 stores a larger sleep interval in the TDMA controller 126. In this manner, the handset dynamically adjusts the duration of the sleep period in response to receipt of radio signals such as control channel signals from a base station.

At step 246, the handset 120 enables a Sleep interrupt, and at step 248 powers down the TDMA controller 126, transmitter 132, and receiver 124. Powering down the TDMA controller 126, transmitter 132, and receiver 124 reduces current drain from the battery 133 (FIG. 3) and prolongs the life of battery 133. At step 250, the handset enters sleep mode for a time duration determined by the selected Sleep interval. At step 252, the handset determines if the Sleep interrupt was received from the TDMA controller 126. If no Sleep interrupt was received, the method continues in the sleep mode, step 250. If a Sleep interrupt was received, indicating the end of the sleep duration, the method continues at step 254 by disabling the Sleep interrupt and, at step 256, by powering up the TDMA controller 126, transmitter 132, and receiver 124. The handset resumes searching for control channels received from one or more base stations at step 204 by initializing variables.

If, at step 218, the captured data buffer 134 was not empty, the method continues by building the candidate profile table (CPT) 136. The CPT contains stored control data defining system capability, identity and other necessary information for base stations whose control data has been received by the handset 120 and whose control data meets predetermined requirements. The exact nature of the data is specific to the communications protocol (such as DECT or PHS) employed by the handset 120. Building the CPT 136 begins at step 258 where the first entry in the CDB 134 is selected. As described above in conjunction with FIG. 5, each entry in the CDB 134 preferably consists of one or more of the slot count 182, bit count 180, control data field 184, CRC field 186, scan frequency entry 188, and RSSI value 190.

At step 260, the handset determines if the received signal strength value (RSSI) 190 (FIG. 3) for the selected entry is greater than a predetermined RSSI threshold. If not, the method continues at step 280. If the RSSI value is greater than the RSSI threshold, the method continues at step 262 where the CRC value maintained at storage location 186 is tested. If the CRC value indicates "Bad CRC," the method continues at step 310.

If the CRC value indicates "Good CRC," at step 264 the method determines if the selected entry contains the identity of the base station which transmitted the control data received by the handset 120 and stored in the selected entry. For example, the base station's identity may be stored in the control data storage location 184 (FIG. 3A). If the entry contains identity information, the method continues at step 284.

If the entry does not contain identity information, at step 266 the method determines if the entry includes system capability information for the base station which originated the selected entry. If the entry does include system capability information, the method continues at step 300 where the method checks system capability.

If the entry does not include system capability information, the entry is stored in the candidate profile table 136 at step 268. At step 270, an Identity flag in the candidate profile table 136 for the entry is set to a value of "undetermined," and at step 272 a System Capability flag in the candidate profile table 136 for the entry is set to a value of "undetermined." Execution continues at step 274 where a CRC count is set to 0. At step 276, a Missing count is set to 0 and at step 278 an RSSI count is set to 0.

At step 280, it is determined if there are more entries in the captured data buffer 134. If so, at step 282 the next entry is selected and execution returns to step 260 as the method continues building the candidate profile table 136. If there are no more entries in the CDB 134, execution returns to step 220.

If, at step 264, it was determined that the selected entry in the CDB 134 contains base station identity information, at step 284, it is determined if the base station's identity is acceptable to the handset 120. A base station may be acceptable to the handset 120 if, for example, the handset 120 has access rights to that base station. If the identity is acceptable, at step 286 the entry is stored in the candidate profile table 136 and the entry's Identity flag in the CPT 136 is set to "acceptable" in step 258. Execution then continues at step 296.

If the entry's identity was not acceptable, at step 290, it is determined if the base station has other identities, for example, secondary or tertiary identities which may be defined in a DECT system. If not, execution continues at step 280 where the method checks for more entries in the CDB 134. If there are other identities, at step 292, the entry is stored in the CPT 136 and at step 294 the Identity flag in the CPT 136 for the selected entry is set to "undetermined." At step 296, the entry's System Capability flag is set to "undetermined" in the CPT 136. Finally, an Inhibit Stepped On flag for the entry in the CPT 136 is set to "false" at step 298. Execution then continues at step 274.

If, at step 266, the method determined that the entry contains system capability information for the base station, at step 300 it is determined if the system capability acceptable to the handset 120. If the system capability is not acceptable, the entry is not stored and control returns to step 280 where the method checks for more entries in the CDB 134. As an example, in PHS an unacceptable system capability occurs when the software version number (RT-MM version number) does not agree with the handset's software version number. If the system capability is acceptable, at step 302 the entry is stored in the CPT 136 and at step 304 the Identity flag in the CPT 136 for the entry is set to "undetermined." At step 306, the System Capability flag in the CPT 136 for the entry is set to "acceptable" and at step 308 the Inhibit Stepped On flag in the CPT 136 for the entry is set to "false." Execution then continues at step 274.

If at step 262, it was determined that a selected entry's CRC was "bad," at step 310 the entry is stored in the candidate profile table 136. Then, at step 312, the Entry Identity flag in the CPT 136 is set to "undetermined," at step 314 the entry's System Capability flag is set to "undetermined," and at step 316 the entry's Inhibit Stepped On flag is set to "false." At step 318, the CRC count is set to 1 and execution continues at step 276.

If, at step 226, it was determined there was at least one entry in the CPT 136, execution continues at step 320 where an Examine Stored CPT interrupt count is set to 0. At step 322, the an Examine Stored CPT interrupt is enabled and at step 324, the method continues scanning for a suitable base at the frequency provided to the TDMA controller 126. Execution continues in a loop including steps 324 and .326 until an Examine Stored CPT interrupt is received from the TDMA controller 126. If an Examine Stored CPT interrupt is received, at step 328 it is determined if the captured data buffer 134 is empty. If the CDB 134 is not empty, execution continues at step 340.

If the CDB 134 is empty, at step 330 the Examine Stored CPT interrupt count is incremented and at step 332 it is determined if this count is equal to an Final Examine CPT count. If not, execution returns to step 324 and scanning for a suitable base continues. If the Examine Stored CPT interrupt count is equal to the Final Examine CPT count, at step 334 frequency scanning in the TDMA controller 126 is disabled, at step 336 all entries in the candidate profile table 136 are cleared and at step 338 the Examine Stored CPT interrupt is disabled. Execution continues at step 228.

If, at step 328, the CDB 134 was not empty, the method then tries to find a suitable base station from the entries in the CDB 134. At step 340 the first entry in the CDB 134 is selected. At step 342, the method tries to match the selected entry from the captured data buffer 134 with an entry from the candidate profile table 136. Each entry includes an associated slot count 182 and bit count 180 (FIG. 3). Entries which originated at the same base station should have the same slot count 182 and bit count 180. Because of timing drift, the slot count 182 and bit count 180 of respective entries may not match but may vary slightly. If variation in the slot count 182 and the bit count 180 for the entry in the CDB 134 is within a predetermined range of the slot count 182 and the bit count 180 for an entry in the CPT 136, there is a match between the entry selected from the CDB 134 and the entry in the CPT 136, step 344. If there is no match, execution continues at step 424. If there is a match, at step 346 the stored System Capability flag and Identity flag, as well as the Bad CRC count and the Bad RSSI count and the Missing count are retrieved from the candidate profile table 136 and these flags and counts of the matched entry are updated by examing the new collected control data 184, CRC status 186, and RSSI value 190 in the captured data buffer 134. At step 348, it is determined if an entry from the candidate profile table has been presented a consecutive predetermined number of times. If not, execution continues at step 352. If so, at step 350, the Missing CRC count is reset to 0 and execution continues at step 352.

At step 352, it is determined if the Inhibit Stepped On flag for the entry selected from the captured data buffer 134 is set to "true." If not, execution continues at step 364. If the Inhibit Stepped On flag is set to "true," at step 354 it is determined if the CRC flag for the selected entry from the CDB 134 is set to "good CRC." If not, at step 356 the selected entry is eliminated from the CPT 136 and execution continues at step 376. If the CRC flag is set to "good CRC." at step 358 it is determined if the RSSI value for the selected CDB entry is greater than a predetermined RSSI threshold. If so, at step 360, the stored CPT entry position is replaced with the CDB position and execution continues at step 364. If the RSSI value is not less than the RSSI threshold, at step 362 the entry is eliminated from the CPT 136 and execution continues at step 376.

If The Inhibit Stepped On flag of the entry selected from the CDB 134 was set to "false" in step 352, at step 364 the method determines if CRC flag of the entry from the CDB 134 is set to "good CRC." If not, execution continues at step 388. If the CRC flag was set to "good CRC," at step 366 the method determines if the entry's CRC flag has been set to "good CRC" for a predetermined consecutive number of times. If not, execution continues at step 371. If so, at step 368, the CRC count is reset to zero and execution continues at step 371.

At step 371, the method determines if the entry selected from the CDB 134 includes identity information for the base station which originated the entry. If so, execution continues at step 402. If not, at step 372 the method determines if the entry selected from the CDB 134 includes system capability information for the base station. If so, execution continues at 414. If not, at step 365, the method determines if the received signal strength indicator (RSSI) value is greater than a predetermined threshold. If so, execution continues at step 366. If not, at step 366 it is determined if the entry's RSSI value was greater than the threshold for a predetermined consecutive number of iterations. If so, the RSSI count is reset to zero at step 368 and execution continues at step 376. If, at step 365, the RSSI value was not greater than the predetermined threshold, at step 370 the RSSI count is incremented by 1.

At step 372, it is determined if RSSI count is greater than an RSSI Eliminate Count. If not, execution continues at step 376. If so, the entry is eliminated from the candidate profile table 136 and execution continues at step 376.

At step 376, the method determines if there are more entries remaining in the captured data buffer 134. If so, the next entry is selected at step 378 and execution returns to step 342. If not, step 380 inquires if all entries have been eliminated from the CPT 136. If not, execution returns to step 330. If all entries have been eliminated from the CPT 136, at step 382, the Examine Stored CPT interrupt is disabled, at step 384 the scanning operation of the TDMA controller 126 is disabled and at step 386, all entries are cleared from the CPT 136. Execution returns to step 228.

If, at step 364, the CRC flag was not set to "good CRC," at step 388 the CRC count is incremented by 1. At step 390, the method determines if the inhibit time period has expired. The inhibit time period corresponds to a time period which captured data buffer entries are tested for an overlapping condition indicated by a "Bad CRC" entry for a predetermined consecutive number of times. If the inhibit time period has expired, at step 392 the method determines if the CRC count is greater than Eliminate CRC count. If not, execution returns to step 365. If so, the entry is eliminated from the CPT 136 and execution returns to step 376. If, at step 390, the inhibit time period had not expired, at step 396, the method determines if there have been more than a predetermined consecutive number of CRC errors within the inhibit period. If not, execution returns to step 365. If so, the Entry is Stepped On flag is set to "true" at step 398. At step 400, the inhibit function of TDMA controller 126 is enabled and execution returns to step 376.

If the CDB entry included base station identity information at step 371, at step 402 the method determines if the identity of the base station is acceptable to the handset 120. An acceptable base station is one for which the handset has access rights. If not, at step 404, the method inquires if the handset has checked all of the base station's identity information. If not, execution returns to step 365. If so, the entry is eliminated from the CPT 136 at step 406 and execution returns to step 376. If, at step 402, the base station's identity was acceptable to the handset 120, at step 408 the Identity flag in the CPT 136 for the entry is set to "acceptable" At step 410 the method determines if the System Capability flag for the entry is set to "acceptable." If not, execution returns to step 365. If so, the method identifies the selected entry as the suitable base station at step 412 and execution continues at step 430.

If, at step 372, the entry selected from the CDB 134 included system capability information for the base station, at step 414 the system determines if the system capability information for the base station is acceptable to the handset 120. If not, the entry is eliminated from the CPT 136 at step 416 and execution continues at step 376. If so, the System Capability flag for the entry is set to "acceptable" at step 418. At step 420, it is determined if the Identity flag for the entry is set to "acceptable." If not, execution returns to step 365. If so, the entry is identified as the suitable base station at step 422 and execution continues at step 430.

If, at step 344, there was no match between the entry from the CDB 134 and entry from the CPT 136, at step 424 the Missing count is incremented by 1. At step 426, the method inquires if the Missing count is greater than Eliminate Missing count (a threshold value) for the entry eliminated from the CPT 136. If not, execution continues at step 376. If so, at step 428, the entry is eliminated from the CPT 136 and execution continues at step 376.

If, at step 412 or step 422 the method identified the base station as the suitable base station, at step 430 the Examine Stored CPT interrupt is disabled and at step 432 the frequency scanning operation of the TDMA controller 126 is disabled. At step 434, an Acquire Multiframe (for DECT systems) or Superframe (for PHS systems) flag is set to "false" and at step 436 a Set Acquire Slot Bit Synchronization flag is set to false. At step 438, the TDMA controller 126 is enabled for synchronization, at step 440 a Synchronization interrupt count is set to 0 and at step 442, the Synchronization interrupt count is enabled.

During steps 444 and 446, execution operates in a loop until the TDMA controller 126 generates a Synchronization interrupt. At this point, the handset 120 is attempting to synchronize with a base station that had acceptable system capability, an acceptable identity, and for which the received signal strength and CRC are acceptable. To ensure that none of these qualities has changed, the method again verifies them.

At step 448, the method determines if the entry in the candidate profile table 136 identified as corresponding to the suitable base station remains in the CDB 134 or if the entry is missing. The entry is missing if the slot count 182 and bit count 180 (FIG. 2) for the entry were sufficiently different from the slot count 182 and bit count 180 previous stored in the CPT 136. If the entry is missing, execution continues at step 478. If the entry was not missing, at step 450 the method determines if the entry has been presented more than a predetermined consecutive number of times. If not, execution continues at step 454. If so, the Missing count is reset to 0 and execution continues at step 454.

At step 454, the method determines if the CRC flag for the entry is still "good CRC." If not, execution continues at step 482. If so, at step 456, the method determines if the entry has had a CRC flag of "good CRC" for more than a predetermined consecutive number of times. If not, execution continues at step 460. If so, the CRC count is reset to 0 and then execution continues at step 460.

At step 460, the method determines if the entry includes a multiframe or superframe packet message. For example, in the PHS system, receipt of an identifier designated BCCHA indicates the beginning of a superframe. In the DECT system, receipt of the multiframe number information includes the base station's multiframe number. If the entry includes a multiframe or BCCHA message, execution continues at step 486. If not, at step 462, the method determines if the entry includes the static system information (for DECT) or any LCCH (for PHS) element. If so, execution continues at step 500.

If not, at step 464, the method inquires if the RSSI value for the entry is greater than a predetermined threshold. If not, execution continues at step 465. At step 465, the RSSI count is incremented by one and at step 467, it is determined if the RSSI count is greater than Eliminate RSSI count. If so, execution continues at step 474. If not, execution continues at step 444. If at step 464, the RSSI value for the entry was greater than the predetermined threshold, at step 466, the method inquires if the entry's RSSI value has been greater than the predetermined threshold for more than a predetermined consecutive number of times. If not, execution continues at step 470. If so, at step 468, the RSSI count is reset to 0. At step 470, the Synchronization interrupt count is incremented. At step 472, if the Synchronization interrupt count is greater than a Final Synchronization count, synchronization is exited and execution continues at step 474. If the Synchronization interrupt count is less than a Final Synchronization count, execution returns to step 444 to await receipt of a Synchronization interrupt.

In the case of an exit synchronization, at step 474 the synchronization operation of the TDMA controller 126 is disabled and the Synchronization interrupt is disabled at step 476. Control returns to step 228 to again attempt to identify a suitable base station.

If, at step 448, the entry corresponding to the base station identified as suitable is missing, at step 478 the Missing count is incremented by 1. At step 480, the method inquires if the Missing count is greater than a predetermined number. If so, execution continues at 474 and synchronization is exited. If not, execution continues at step 444 and the method awaits receipt of a Synchronization interrupt.

If, at step 454, the entry identified as a suitable base station had a CRC flag of "bad CRC," at step 482 the CRC count is incremented by 1. At step 484, if the CRC count is greater than a predetermined number, execution returns to step 474 and synchronization is exited. If not, execution returns to step 464 to check the RSSI value of the entry.

If, at step 460, the received data included a multiframe or BCCHA packet, at step 486, the Multiframe Or Superframe flag is set to "true." At step 488, the method determines if the Acquire Slot/Bit Synchronization flag is set to true. If not, execution proceeds to step 464 to check the RSSI value of the entry. If the Acquire Slot/Bit Synchronization flag is set to true, at step 490 the handset acquires synchronization with the identified suitable base station. At step 492, a suitable base determination is made and at step 494 the synchronization operation of the TDMA controller 126 is disabled. At step 496, the Synchronization interrupt is disabled and the method ends at step 498.

If, at step 462, the received data included the static system information/LCCH element, at step 500, the Acquire Slot/Bit Synchronization flag is set to "true." At step 502, the method determines if the Acquire Multiframe/Frame Or Superframe flag is set to "true." If not, execution continues at step 464 where the entry's RSSI value is checked. If so, execution continues at step 490 and the handset acquires synchronization with the base station identified as a suitable base.

As can be seen from the foregoing, the present invention provides a method and apparatus for identifying a suitable base station from among a plurality of base stations transmitting beacons or control channels which are received by a radiotelephone handset. The handset locates base stations whose control channel signals are unsynchronized with and lag another control channel signals. The handset enters a sleep mode to conserve battery power when no control channel signals are present. The invention allows the handset to synchronize to a base station having acceptable signal strength, access rights identity and system capability.

While a particular embodiment of the present invention has been shown and described, modifications may be made. For example, while the exemplary embodiment is described for use in conjunction with the PHS or DECT telecommunications protocols, the invention may be used in conjunction with other communications systems including both analog and digital cordless and cellular telephone systems. It is therefore intended in the appended claims to cover all such changes and modifications which fall within the true spirit and scope of the invention.

What is claimed is:

1. A method for initializing communication between a handset and a base station in a telecommunication system, the telecommunication system including a plurality of base stations and the handset, the method comprising the steps of:

repetitively receiving at the handset a plurality of control channel signals, each control channel signal of the plurality of control channel signals being broadcast by a respective base station, each control channel signal including a respective system information field for the respective base station;

storing the respective system information field including an associated location parameter at the handset each time a control channel signal is received;

identifying as candidate suitable base stations one or more base stations corresponding to stored system information fields which satisfy a predetermined criterion;

selecting a suitable base base station from the candidate suitable base stations, including incrementing a missing count for each candidate suitable base station when the associated location parameter does not match a predetermined anticipated location for the suitable base station, and eliminating the candidate suitable base station as a suitable base station when the missing count exceeds a predetermined missing count threshold; and synchronizing communication between the handset and the suitable base station, wherein the receiving step includes
repetitively receiving the plurality of control channel signals at the handset, and wherein the storing step includes
storing the respective system information fields including an associated location parameter each time a control channel signal is received, and wherein the selecting step comprises the steps of
incrementing a missing count for each candidate suitable base station when the associated location parameter does not match a predetermined anticipated location for the suitable base station, and eliminating the candidate suitable base station as a suitable base station when the missing count exceeds a predetermined missing count threshold.

2. A method as defined in claim 1 wherein the associated location parameter comprises a bit count and a slot count.

3. A method for initializing communication between a handset and a base station in a telecommunication system, the telecommunication system including a plurality of base stations and the handset, the method comprising the steps of:

receiving at the handset a plurality of control channel signals, each control channel signal of the plurality of control channel signals being broadcast by a respective base station, each control channel signal including a respective system information field for the respective base station;

identifying each base station corresponding to a received control channel;

storing the respective system information field at the handset, including
storing an identity for each identified base station,
inhibiting the storing of system information fields for a predetermined inhibit time when a predetermined error criterion is satisfied and,
following the predetermined inhibit time, storing a subsequent system information field and determining if the subsequent information field was received from a previously unidentified base station;

identifying as candidate suitable base stations one or more base stations corresponding to stored system information fields which satisfy a predetermined criterion;

identifying the previously unidentified base station as a candidate base station if the subsequent information field satisfies a predetermined error criterion;

selecting a suitable base station from the candidate suitable base stations; and synchronizing communication between the handset and the suitable base station, further comprising the steps of
identifying each base station corresponding to a received control channel and wherein the storing step includes storing an identity for each identified base station, and
inhibiting the storing of system information fields for a predetermined inhibit time when a predetermined error criterion is satisfied and,
following the predetermined inhibit time, storing a subsequent system information field, determining if the subsequent information field was received from a previously unidentified base station, and identifying the previously unidentified base station as a candidate base station if the subsequent information field satisfies a predetermined error criterion.

4. A method as defined in claim 3 wherein the method further comprises the step of determining a cyclical redundancy check (CRC) status for each received control channel signal and wherein the storing step includes storing a CRC indication for the received control channel signal at the handset, and wherein the previously unidentified base station is identified as a candidate base station if the subsequent information field includes an acceptable CRC indication.

5. A method for initializing communication between a handset and a suitable base station in a telecommunication system, the telecommunication system including the handset and a plurality of base stations, each of the base stations transmitting one control channel of a plurality of control channels, each control channel including system information for the transmitting base station, each control channel being transmitted at a predetermined timing location, the method comprising the steps of:

receiving at the handset a control channel transmitted by a transmitting base station;

storing in a captured data buffer at the handset the system information for the received control channel, the stored system information including at least one of an identity of the transmitting base station and system capability of the transmitting base station;

storing in the captured data buffer, with the system information for the control channel, a received signal strength indication corresponding to the received signal strength for the control channel;

storing in the captured data buffer, with the system information for the control channel, a timing location for the control channel;

identifying the transmitting base station as a candidate suitable base station if the stored received signal strength indication corresponds to an acceptable received signal strength indication;

identifying the transmitting base station as a candidate suitable base station if the stored identity corresponds to an acceptable identity of the transmitting base station;

identifying the transmitting base station as a candidate suitable base station if the stored system capability corresponds to an acceptable system capability of the transmitting base station;

storing, in a candidate profile table, system information for all candidate suitable base stations;

reading from the captured data buffer system information from a subsequently transmitted control channel transmitted by a subsequently transmitting base station;

comparing a timing location of the subsequently transmitted control channel with the stored timing location and determining that the subsequently transmitting base station is the transmitting base station if the timing location of the subsequently transmitted control channel matches the stored timing location;

if the timing location of the subsequently transmitted control channel matches the stored timing location, determining if the subsequently transmitted control channel includes identity information for the subsequently transmitting base station;

if the identity information for the subsequently transmitting base station satisfies predetermined base station identity criteria, determining if the subsequently transmitted control channel includes system capability information for the subsequently transmitting base station;

if the system capability information for the subsequently transmitting base station satisfies predetermined capability criteria, identifying the transmitting base station as the suitable base station; and synchronizing communication with the suitable base station.

6. A method for initializing communication between a handset and a suitable base station as recited in claim 5 wherein the method further comprises the steps of storing in the captured data buffer, with the system information for the control channel, a cyclical redundancy check (CRC) status for the control channel and storing in the captured data buffer a CRC Count representative of the number of times the CRC status for the transmitting base station was unacceptable.

7. A method for initializing communication between a handset and a suitable base station as recited in claim 25 wherein the method further comprises the steps of, if the CRC count exceeds a predetermined threshold, inhibiting reception of subsequently transmitted control channels for a predetermined time period, then receiving a lagging control channel and replacing the stored system information for the received control channel with system information for the lagging control channel if a cyclical redundancy check status for the lagging control channel corresponds to an acceptable cyclical redundancy check status and if received signal strength indication for the lagging control channel corresponds to an acceptable received signal strength indication.

8. A method for initializing communication between a handset and a suitable base station as recited in claim 5 wherein the method further comprises the steps of establishing a first scan frequency for receiving the control channel, incrementing to a second scan frequency if no control channel is received at the first scan frequency., and entering a sleep mode for a predetermined time period if no control channel is received at the second scan frequency.

9. A method for initializing communication between a handset and a suitable base station as recited in claim 8 wherein the method further comprises the steps of varying the predetermined time period in response to reception of control channels at the first and second scan frequencies.

10. A method for initializing communication between a handset and a suitable base station as recited in claim 5 wherein the method further comprises the steps of, after identifying the transmitting base station as the suitable base station, receiving a synchronizing control channel transmitted by the transmitting base station and if the CRC status of the synchronizing control channel corresponds to acceptable CRC status, synchronizing communication with the suitable base station.

11. A method for initializing communication between a handset and a suitable base station as recited in claim 10 wherein the method further comprises the steps of repetitively receiving the synchronizing control channel until bit synchronization, slot synchronization, frame synchronization and multiframe synchronization are established between the handset and the suitable base station.

* * * * *

UNITED STATES PATENT AND TRADEMARK OFFICE
CERTIFICATE OF CORRECTION

PATENT NO. : 5,754,956
DATED : May 19, 1998
INVENTOR(S) : Abreu et al.

It is certified that error appears in the above-indentified patent and that said Letters Patent is hereby corrected as shown below:

Claim 7

At column 22, in the second line of claim 7, please replace "25" with --6--.

Signed and Sealed this

Eighth Day of December, 1998

Attest:

BRUCE LEHMAN

Attesting Officer

Commissioner of Patents and Trademarks